United States Patent
Wilen

(10) Patent No.: US 8,639,573 B2
(45) Date of Patent: Jan. 28, 2014

(54) COMMERCIAL GAME SYSTEM AND METHOD

(75) Inventor: Richard Wilen, Boca Raton, FL (US)

(73) Assignee: WILopEN Products, LC, Deerfield Beach, FL (US)

(*) Notice: Subject to any disclaimer, the term of this patent is extended or adjusted under 35 U.S.C. 154(b) by 0 days.

(21) Appl. No.: 13/021,608

(22) Filed: Feb. 4, 2011

(65) Prior Publication Data

US 2011/0124390 A1 May 26, 2011

Related U.S. Application Data

(63) Continuation-in-part of application No. 12/464,740, filed on May 12, 2009.

(51) Int. Cl.
 *G06Q 30/00* (2012.01)
(52) U.S. Cl.
 USPC .............. 705/14.41; 705/14.71; 705/14.14; 705/14.18; 705/14.1; 705/14.73; 705/14.28; 705/14.39; 705/14.27; 705/14.4; 705/14.64; 705/1.1; 705/26.1; 705/26.43; 705/26.8; 705/500; 463/9; 463/42
(58) Field of Classification Search
 USPC ........ 705/1.1, 26.8, 500, 14.71, 14.14, 14.18, 705/14.1, 14.73, 14.28, 14.39, 14.27, 14.41, 705/14.4, 14.64; 463/9, 42
 See application file for complete search history.

(56) References Cited

U.S. PATENT DOCUMENTS

| | | | | |
|---|---|---|---|---|
| 7,133,838 | B2* | 11/2006 | Tokuma | 705/26.43 |
| 2002/0013174 | A1* | 1/2002 | Murata | 463/42 |
| 2002/0082067 | A1* | 6/2002 | Mckay et al. | 463/9 |
| 2003/0040964 | A1* | 2/2003 | Lacek | 705/14 |
| 2004/0098449 | A1* | 5/2004 | Bar-Lavi et al. | 709/202 |
| 2007/0235932 | A1* | 10/2007 | Karwat Singer et al. | 273/256 |
| 2007/0243936 | A1* | 10/2007 | Binenstock et al. | 463/42 |
| 2007/0265919 | A1* | 11/2007 | Jarjour | 705/14 |
| 2008/0281704 | A1* | 11/2008 | Shuhy et al. | 705/14 |
| 2009/0037270 | A1* | 2/2009 | Patro | 705/14 |
| 2011/0161190 | A1* | 6/2011 | Lotvin et al. | 705/26.1 |
| 2012/0142428 | A1* | 6/2012 | Wilson et al. | 463/42 |

* cited by examiner

*Primary Examiner* — Yogesh C Garg
(74) *Attorney, Agent, or Firm* — James David Johnson; Johnson & Martin, P.A.

(57) ABSTRACT

A system and method for providing a commercial game that poses questions to a user related to advertisements that the user views or listens to using a multimedia device such as a computer connected to the Internet. Points may be awarded to the user based on the number of questions answered correctly, the number of advertisements viewed, the length of time advertisements are viewed, the number of attempts at answering each question before providing the correct answer, or other advertiser-selected criteria. Points earned by the user are immediately redeemable for services such as subscription services, movies downloads, Pay-Per-View credits, or for any other tangible or intangible good, service, or reward representing a monetary value. If the user provides an incorrect answer to a question, the user is permitted to watch the advertisement multiple times until a correct answer is provided and points are awarded.

25 Claims, 12 Drawing Sheets

COMMERCIAL GAME SYSTEM AND METHOD

CROSS-REFERENCE TO RELATED APPLICATION

This application claims the priority from U.S. nonprovisional patent application Ser. No. 12/464,740 filed May 12, 2009. The foregoing application is incorporated in its entirety herein by reference.

FIELD OF THE INVENTION

The invention relates to methods and systems for advertising. More particularly, the invention relates to methods and systems for advertising to consumers a commercial game and interactive multimedia.

BACKGROUND

Traditionally, advertising to consumers has been accomplished using passive means in that advertisements have been strategically presented in printed publications, on billboards, and through radio, television and internet-based media with the hope that consumers would read, view, listen to, or otherwise pay attention to the advertisements. These types of passive advertising are generally ineffective in that the advertiser usually has no means for knowing which consumers have seen or heard the advertiser's advertisement. The inability to collect information concerning the identity of the consumer and how closely the consumer scrutinized or paid attention to the advertisement has limited the value of traditional advertising systems and methods. The potential of data mining to collect consumer information related to advertising viewing and listening habits is underutilized by conventional advertising.

Conventional advertisements are often ignored by consumers because they are presented passively and fail to engage the consumers. A need exists for interactive advertising systems and methods that use interactive games and multimedia presentations to entertain the consumer and which can be used for data mining purposes to collect personal identifying information that can be related to each specific consumer's shopping and advertisement browsing habits.

SUMMARY

The systems and methods described herein pertain to an interactive gifting system that entertains and involves the consumer with its interactive design so as to encourage repeat business and functions as a means of data mining to allow targeted and predictive advertising to specific consumers. The gifting system can utilize a website, a global telecommunications system, a gift card, a remote server, funds data, and a means by which the gift card can be delivered from a gift giver to a recipient. The website can be accessed by the gift giver via a global telecommunications network and may include account management features that permit the gift giver to transfer funds to a card issuer. The gift card can include a unique card identifier, for example, a gift card number, that can be used by a card issuer to match the gift card to the funds transferred from the gift giver to the card issuer for purposes of funding the gift card.

The gift card may be a virtual e-card, for example, a card that is accessed by clicking on a web link that opens the e-card in a web browser; a printable email card; a two-dimensional gift card form that can include a single sheet having perforations to separate a detachable gift card, greeting card, and envelope; or a pre-scored and/or pre-folded, three-dimensional pop-up card such as the Assembleeze™ pop-up cards manufactured by WILopEN Products, LC, of Deerfield Beach, Fla., which are folded in such a way that a portion of the card "pops up" or rises when the card is changed from closed configuration to open configuration. The pop-up portion of the card may include a photograph, e.g., a photograph of the gift giver, artwork, a logo, alphanumeric text, or any other desired information or images. The three-dimensional pop-up cards can be in the form of a greeting card or a business card and may also include a gift representation that visually represents a gift item selected by the gift giver for the gift recipient. The gift card may be custom designed for or by the gift giver or may be selected by the gift giver from among one or more templates provided by the card issuer.

The remote server is connected to the global telecommunications network and can be used to store the funds data associated with the gift card. The funds data relates to the amount of funds transferred by the gift giver to the card issuer. The means for delivering or transmitting the gift card from the gift giver to the recipient may be a mailing or courier service, electronic mail (email), facsimile, attachment to or insertion into packaging (e.g., to a top of a pizza box) or printed publications (e.g., into a magazine), or any other suitable delivery means.

The gift card system is highly customizable by the user or gift giver so that the gift giver can personally control the entire gift-giving process, including, without limitation, selection of a gift item that can be merchandise, a service, or money, personalization of a real physical or virtual gift card, and timing of delivery of the gift card to the gift recipient. The gift giver is thus able to select and purchase gifts chosen naturally by the gift giver. In addition, once the gift recipient receives the gift card, the recipient has several options that can include redeeming the gift card for the gift item selected by the gift giver, rejecting the gift item selected by the gift giver and selecting a different gift item of the same or lesser value, rejecting the gift item selected by the gift giver and selecting a different gift item of greater value by contributing additional funds toward the purchase of the different gift, or re-gifting the gift card or its monetary value to another recipient.

The gift card system can also include systems and methods for providing a commercial game that poses questions to a user related to advertisements that the user views or listens to using a multimedia device such as a computer connected to the Internet. Points may be awarded to the user based on the number of questions answered correctly, the number of advertisements viewed, the length of time advertisements are viewed, the number of attempts at answering each question before providing the correct answer, or other advertiser-selected criteria. Points earned by the user are immediately redeemable for services such as subscription services, movies downloads, pay-per-view credits, or for any other tangible or intangible good, service, or reward representing a monetary value. If the user provides an incorrect answer to a question, the user is permitted to watch the advertisement multiple times until a correct answer is provided and points are awarded.

The gift card system provides several advantages over the traditional plastic gift card distributed and sold by retailers. Because the gift card of the gift card system can be manufactured as a paper gift card, the thinness of the paper gift card (versus a conventional plastic card) enhances the surprise effect experienced by the recipient who cannot feel the paper card through the envelope into which the card is inserted. More importantly, however, because the paper gift card cannot be felt through the envelope in which it is mailed, the paper gift card is a more secure way to send a gift via mail. The presence of the paper gift card inside the envelope is not readily apparent to an individual who may intercept mail for purposes of stealing gift cards. On the other hand, a conventional plastic gift card is easily felt, and is thus discoverable, when placed inside a standard paper envelope.

The gift card system is also advantageous because the gift card has no value to anyone other than the recipient intended by the gift giver because the gift giver must provide certain predetermined identifying information related to the recipient. After this recipient information is entered into the secure card issuer website, the recipient information can be stored on the card issuer's remote servers. To activate the gift card, the recipient must also provide matching recipient information or enter into the website a password that was generated by the gift card system and delivered via email, mail, or another delivery means when the user purchased the gift card for the recipient. Another advantage of the gift card system is that the gift card can be used for a gift other than the gift originally intended by the gift giver. The gift card system also provides an advantage in that the gift cards can be distributed inexpensively and quickly in the form of a paper gift card or as an electronic or digital card.

The method of the invention is also advantageous because a gift card account website may be used to advertise to the gift givers and recipients who access the website to fund and to activate the gift cards. By advertising through game-style product questions, advertisers (e.g., retailers and manufacturers) can both entertain users of the website and educate those users about the advertiser's products. Users of the website and system also benefit because points earned by answering product questions correctly can be redeemed immediately by a user for items such as downloadable movies and songs or pay-per-view movie credits.

Another advantage of the methods described herein is the ability of the system to advertise to people having vision and hearing impairment, people who are illiterate, and people who do not speak the predominant language of the card issuer or retailer's location. An avatar of the system used in conjunction with text-to-speech software can play or "read" aloud a description of products for sale on the card issuer or retailer's website in the user's own language.

The systems and methods of the invention are also advantageous to the retailer because, unlike when a gift giver purchases a gift item in a retail store and gives the actual gift item to the recipient, in the event that the gift recipient decides to exchange the gift item for a different gift item, the retailer does not incur any costs related to restocking. The retailer is able to avoid restocking costs because the gift item was represented in the form of a gift representation as part of the gift card, but the actual gift item selected by the gift giver for the gift recipient was never physically removed from the retailer's inventory.

Still another advantage of the systems described herein is that the gift recipient can access an account created through a system website to check the balance, purchases made, and other information related to the gift card. The gift recipient may also be provided with access to these account features via an interactive voice response system (IVR).

Yet another advantage of the systems and methods of this invention is that the gift card can be printed and mailed to the gift recipient in addition to being delivered electronically, e.g., by e-mail, to increase the likelihood that the gift recipient receives the gift card. The name of sender can be pre-printed on all the components of a gift card package such as, for example, the printed electronic gift card, a greeting card, and instructions, of the multi-component gift card package. The gift giver can print or hand-write the recipient's name on the same components to further increase the likelihood that the recipient reads the greeting card and gift card. Similar to the electronic gift card, the printed gift card can be viral in nature in that the recipient is directed to the card issuer's website in order to redeem the gift card for the gift item selected by the gift giver or for another gift item selected by the recipient.

The system can also be interactively used by advertisers such as, for example, retailers, service providers, and manufacturers, who may be given access to the gifting system to automatically upload their product and service information for advertisement to users of the website.

Accordingly, the invention features a commercial game system that can include a server connected to a communications network, electronic media connected to the server on which recorded advertisements are stored for playback to a user, a media player device communicatively connected to the server via the communications network, a control device communicatively connected to the media player device comprising control features for entering an answer to questions transmitted by the server. The media player device can include a display screen for playing the recorded advertisements for viewing by the user. The commercial game system also features a number of software programs or software features of a single program including software installed on the server for transmitting questions related to the advertisements that are viewable on the media player device, software installed on the server for determining whether answers entered by the user and transmitted to the server are correct, and software installed on the server for calculating, recording, and displaying the number of points awarded to the user for answering questions correctly. Finally, the commercial game system also features a plurality of goods and services for which the points earned by the user while viewing advertisements and answering questions are redeemable.

In another aspect, the invention can feature the media player device being a computer, the communications network being the Internet, and the advertisements being viewable on a website stored on the server and viewable on the display screen.

In another aspect, the invention can feature the points being redeemable immediately or in the future.

The invention also features a method including the steps of: (a) playing an advertisement on a display screen viewed by a user, wherein the advertisement includes information related to a retail item; (b) presenting the user a series of questions on the display screen related to the retail item; (c) electronically awarding the user points saved into a user account stored on a server based upon the number of questions answered correctly by the user, wherein the server is communicatively connected to the display screen; and (d) providing the user with a plurality of reward items for which the point earned by the user may be redeemed.

Another method of the invention can feature the plurality of reward items including at least one item selected from among the following reward items: pay-per-view movie credits, cable television service credit, satellite television service credit, broadband service credit, premium television channel service credit, satellite radio service credit, on-demand television service credit, music downloads, movie downloads, video game plays, video game downloads, gas credits, airline miles, a downloadable publication, a downloadable video, a downloadable music file, a downloadable audio file, a downloadable audiobook, a streaming video file, a streaming audio file, a downloadable image file, a downloadable computer screen saver, a downloadable video file, a movie rental voucher, and other suitable retail goods and services.

Another method of the invention can feature the retail item including a good or a service.

Another method of the invention can feature the step of permitting the user to gift either the points earned or the reward item selected by the user to a gift recipient.

The invention also features another method including the steps of: (a) playing an advertisement for viewing by a user on a media player device that further includes a display screen, wherein the media player device is communicatively connected to a server via a communications network; (b) after the advertisement has been played for viewing by the user, displaying at least a first question on the display screen, wherein the first question is related to the advertisement; (c) using the media player device, entering an answer to the first question presented on the display screen; (d) transmitting the answer entered by the user from the media player device to the server over the communications network; (e) using software installed on the server, comparing the user's answer to a stored correct answer programmed into the software; (f) awarding one or more points to the user for a user-entered correct answer; (g) electronically recording the number of points awarded to the user on a storage device of the server in a user account associated with the user; (h) transmitting the number of points awarded for the correct answer to the media player device and displaying the number of points awarded on the display screen; and (i) providing a virtual mall accessible through the media player device via the communications network, wherein the virtual mall displays items or services for sale for which the points awarded to the user are redeemable.

Another method of the invention can feature the step of varying the number of points awarded for each correct answer based upon the level of difficulty of the question being answered.

Another method of the invention can feature the step of providing a gifting control communicatively connected to the server, whereby the user redeems points the user has earned by viewing advertisements and answering questions to be delivered as a gift for another person.

Another method of the invention can feature the step of awarding points to the user for incorrect answers to questions in an amount that is less than the number of points awarded for correct answers to the same questions.

Another method of the invention can feature the step of providing the user with a second chance to answer each question when the software installed on the server determines that the answer to a particular question entered by the user is incorrect, wherein the number of points awarded for a correct answer to the question during the user's second chance is less than the number of points that are awarded for correct answer to the question during the user's first chance.

Another method of the invention can feature the step of providing the user with at least a second question to be answered that is different from the first question when the software installed on the server determines that the user has entered an incorrect answer to the first question.

Another method of the invention can feature the step of awarding the user a number of points for a correct answer to the at least second question that is less than the number of points that are awarded for a correct answer to the first question.

Another method of the invention can feature the step of awarding the user a number of points for a correct answer to the at least second question that is more than the number of points that are awarded for a correct answer to the first question.

Another method of the invention can feature the steps of: registering each user by requiring each user to submit personal information that is input into the media player device to the server via the communications network; compiling data that is stored in a database in the server transmitted from the media player device via the communications network, wherein the data includes the personal information submitted by the user and website usage data related to the user's shopping and browsing habits; and selling the data to one or more buyers, wherein the buyers are advertisers, retailers, distributors, and manufacturers.

Another method of the invention can feature the number of points awarded to the user for viewing advertisements provided by a first advertiser being different than the number of points awarded to the user for viewing advertisements provided by a second advertiser.

Another method of the invention can feature the points earned by the user through viewing advertisements provided by a first advertiser having a redemption value that is different from the redemption value of points earned by the user through viewing advertisements provided by a second advertiser.

Another method of the invention can feature the step of awarding the user a number of points dependent upon the number of seconds of advertising viewed.

Another method of the invention can feature the user being permitted to select the number of advertisements viewed.

Another method of the invention can feature the media player device including a device selected from among one or more of the following devices: a computer, a notebook computer, a television, a cellular telephone, a smartphone, a personal digital assistant (PDA), a global positioning system (GPS) device, a handheld gaming device, any other suitable handheld electronic device comprising a display screen, and any other suitable media player device comprising a display screen.

Another method of the invention can feature the display screen being a communicatively connected touch screen that comprises touch screen controls.

Another method of the invention can feature the media player device further including a communicatively connected pointing device.

Another method of the invention can feature the media player device further including a communicatively connected control device.

Another method of the invention can feature the items and services for which points can be redeemed including at least one item or service selected from among the following: pay-per-view movie credits, cable television service credit, satellite television service credit, broadband service credit, premium television channel service credit, satellite radio service credit, on-demand television service credit, music downloads, movie downloads, video game plays, video game downloads, gas credits, airline miles, a downloadable publication, a downloadable video, a downloadable music file, a downloadable audio file, a downloadable audiobook, a streaming video file, a streaming audio file, a downloadable image file, a downloadable computer screen saver, a downloadable video file, a movie rental voucher, and other suitable retail goods and services.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
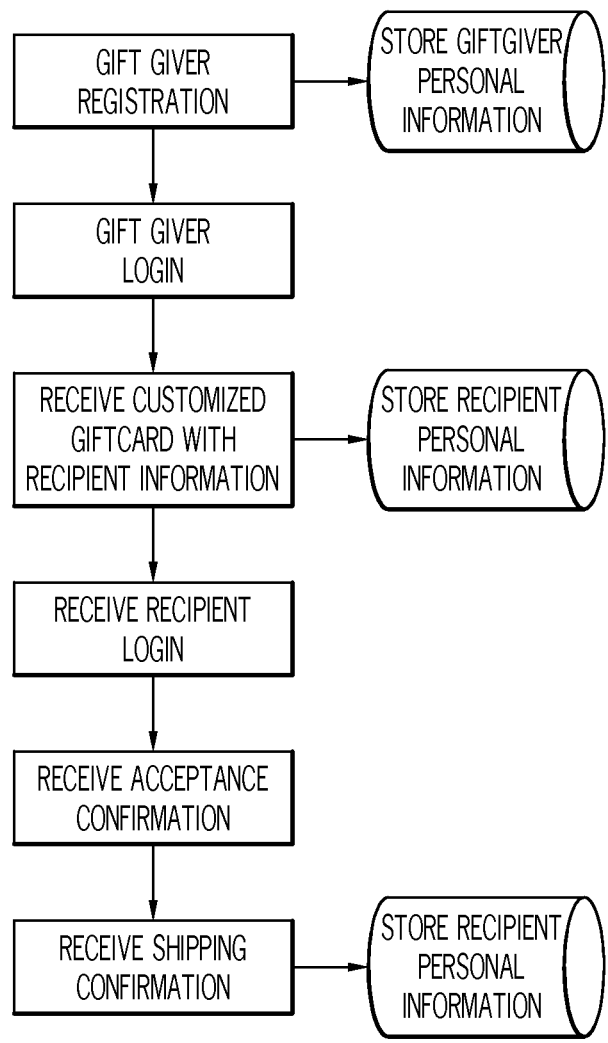
FIGS. 1-5 are flow charts that show one method by which a gift giver can purchase a gift in the form of a gift card for delivery to a recipient.
Figure 2:
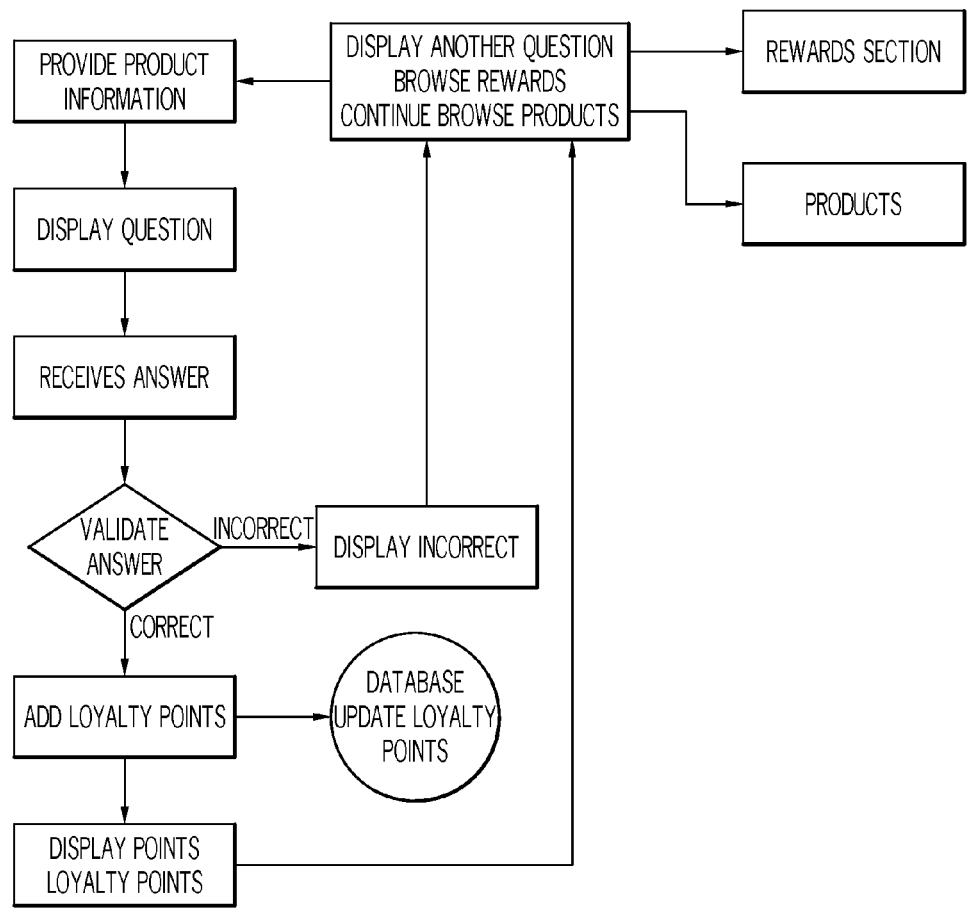
Figure 3:
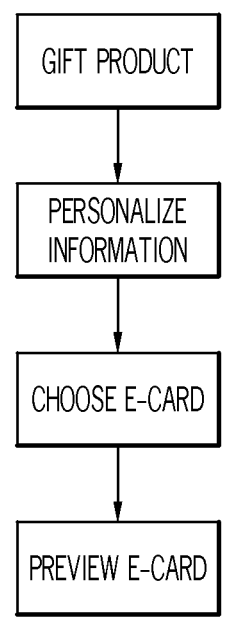
Figure 4:
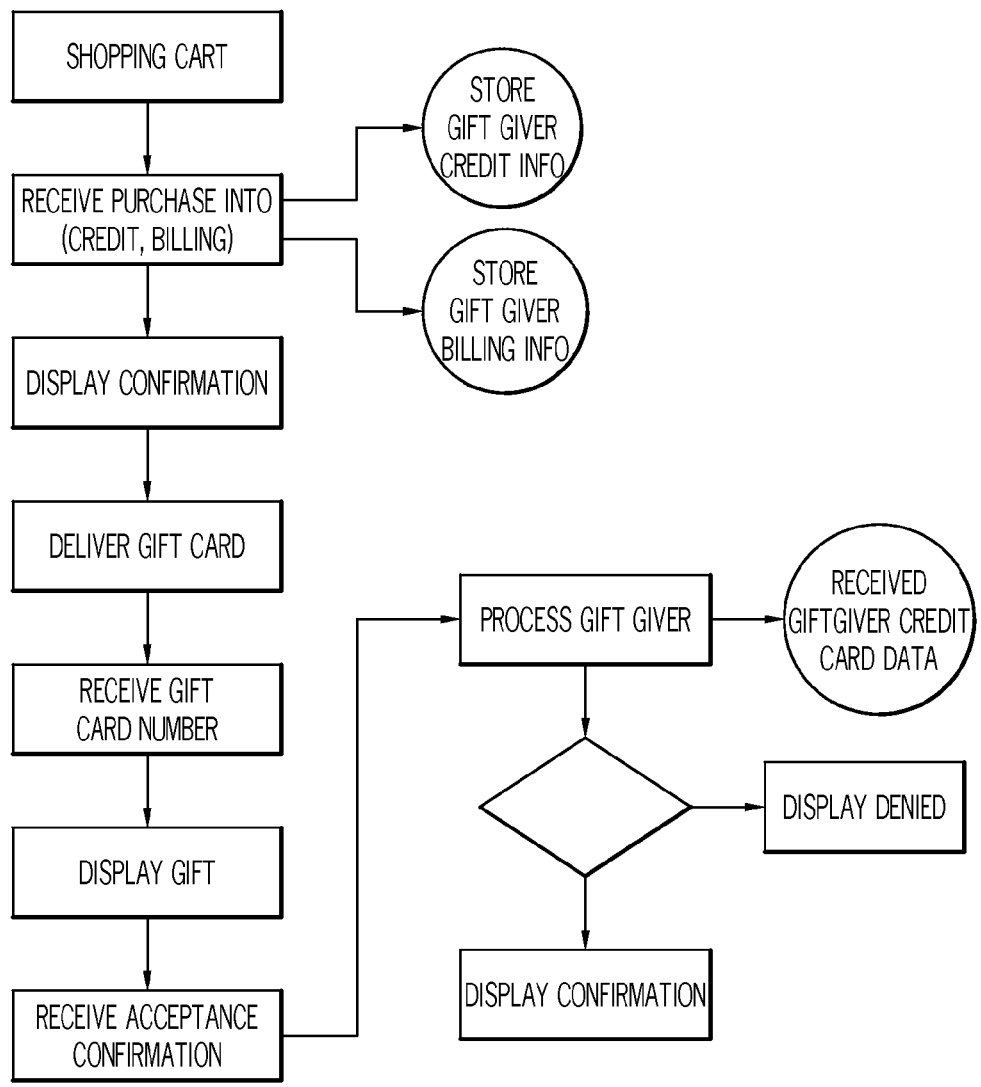
Figure 5:
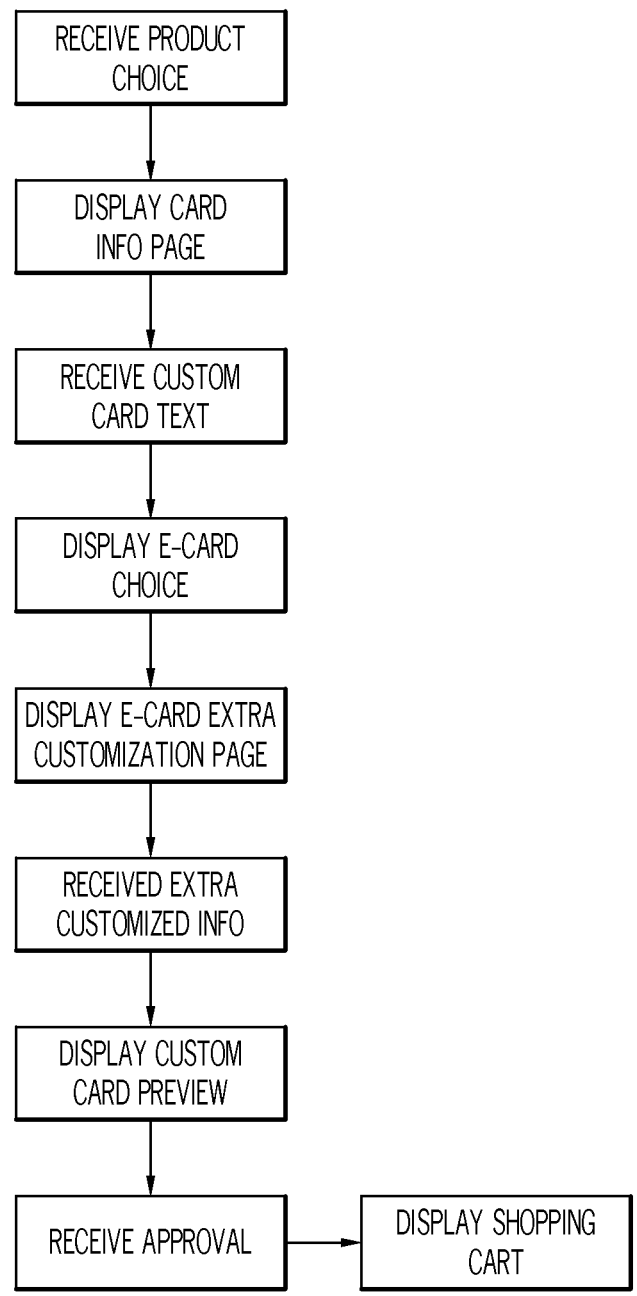
Figure 6A:
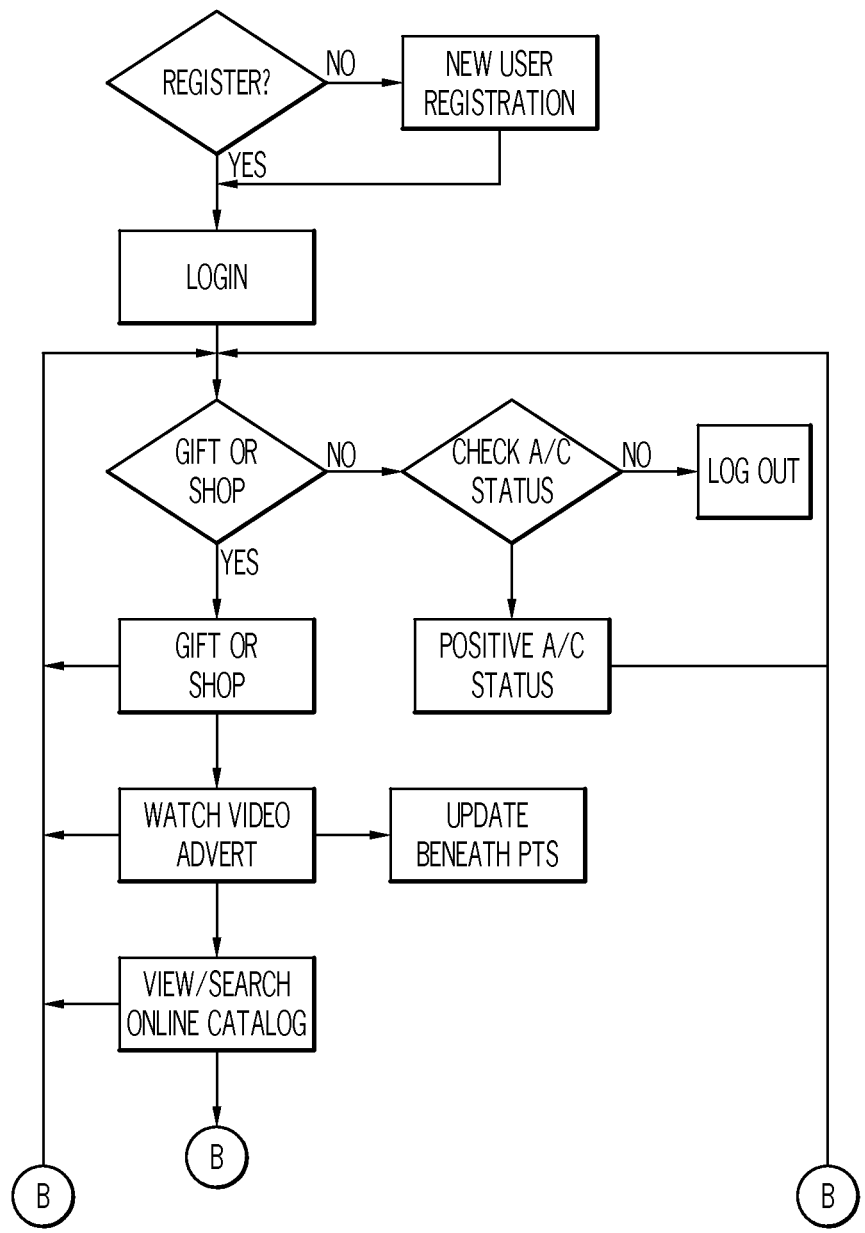
FIG. 6A-6B are flow charts that show another method by which reward points can be earned by a gift giver or a recipient by accessing a card issuer's website.
Figure 6B:
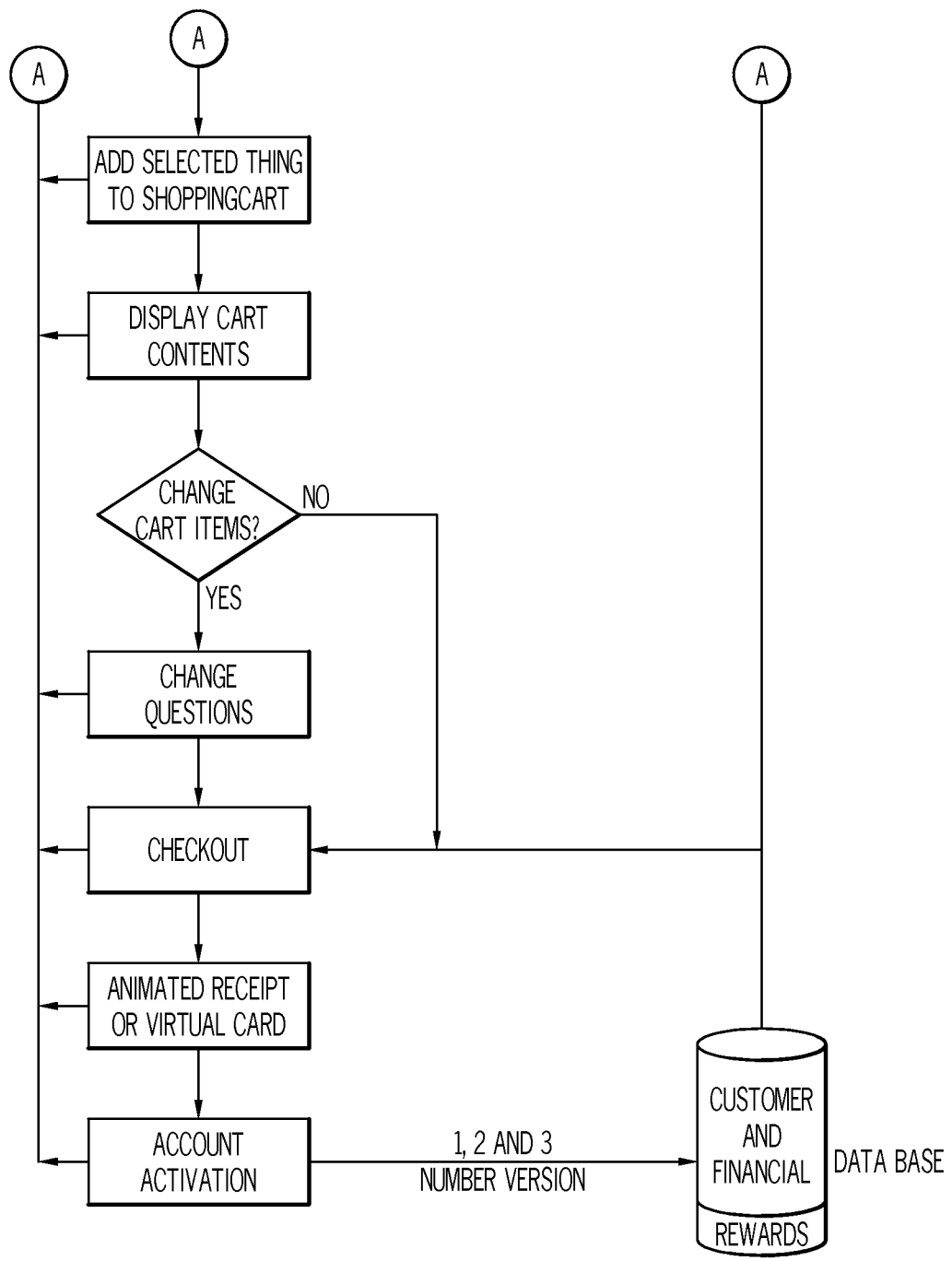
Figure 7:
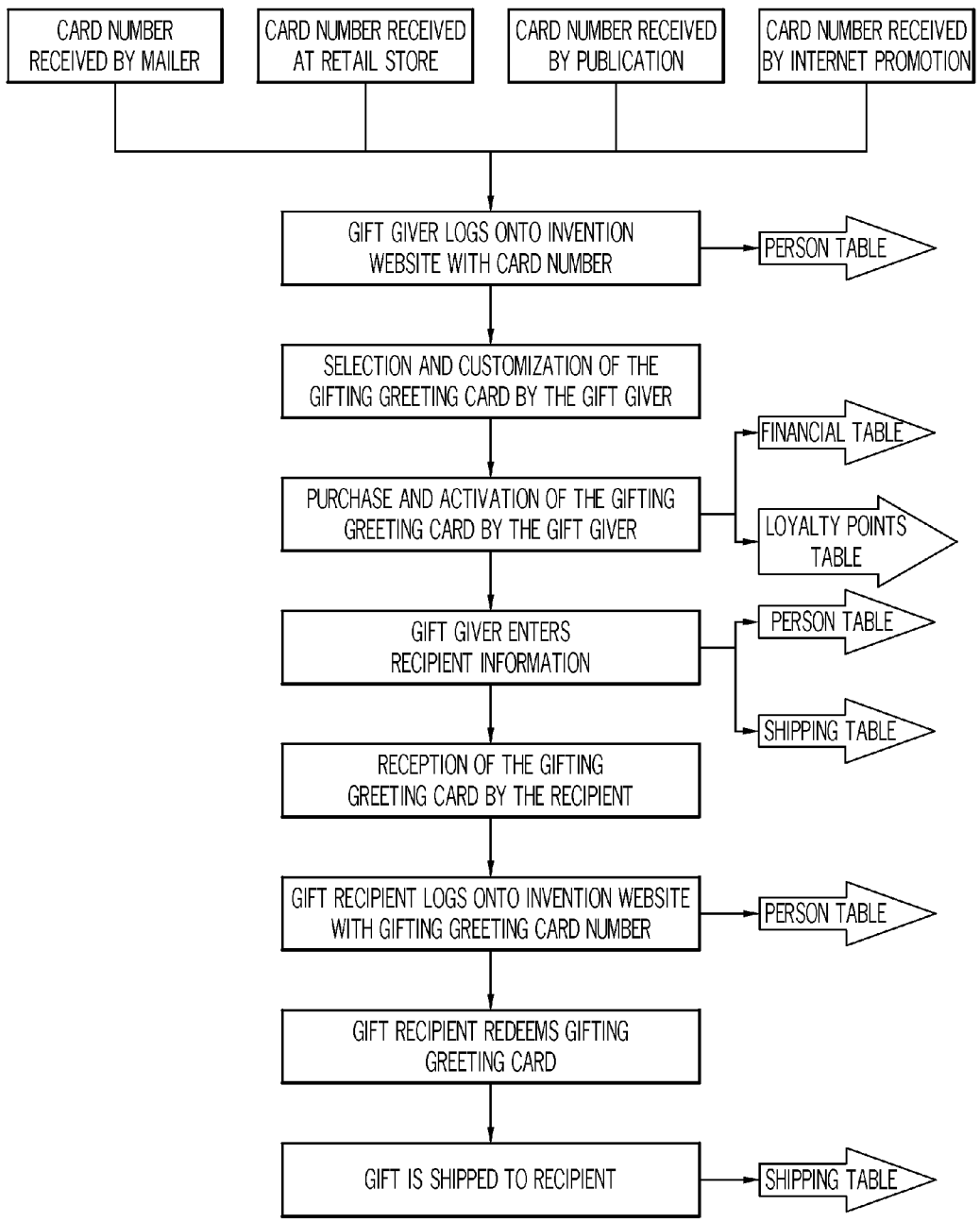
FIGS. 7-8 are flow charts that show other methods by which a gift giver can obtain a gift card that can be delivered to a recipient who accesses a card issuer's website to redeem the gift card for a gift.
Figure 8:
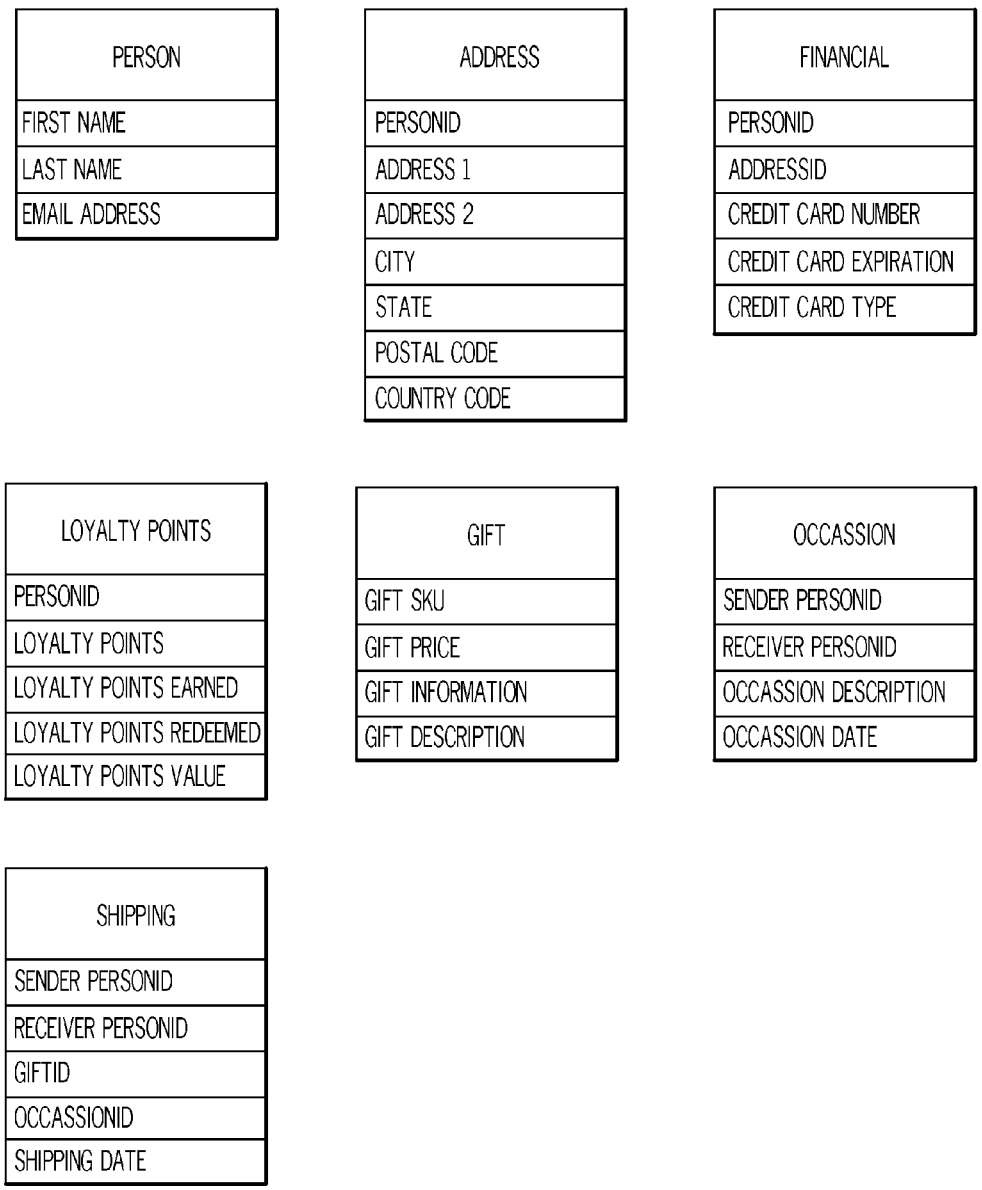

The invention provides interactive gifting systems and methods that can include multimedia components. The gifting system can be utilized by a gift card issuer to promote and advertise retail products and services to a user through gifting, entertainment, and game and rewards methods. The user can be a consumer, and the consumer can be a gift giver or a gift recipient. The card issuer can be an advertiser, a retailer, a manufacturer, or a service provider.

The invention can include a gift card system that allows gift-giving by a gift giver to a gift recipient and serves as an advertising and marketing tool for goods and services produced, provided, and sold by manufacturers and retailers. The gift card system can include a gift card, which may be a physical gift card, an electronic gift card, or both. The system may include only a single gift card so that the gift giver can purchase his or her own greeting card and envelope within which the gift card can be inserted.

In an exemplary embodiment, the gift card can be a combination gift card, greeting card, instruction sheet, and envelope. These components can form a gift card package that can be delivered to the gift recipient. The gift card package can also include a catalog, a brochure, a pamphlet, or another suitable insert containing images or descriptions of products that can be purchased by the gift giver for the gift recipient. These components of the exemplary embodiment may be manufactured by any suitable printing and folding means. Each gift card can be personalized with a unique card identifier such as, for example, a hexadecimal number or a standard sixteen-digit gift card number that may be accepted for payment at point-of-sale (POS) terminals at retail locations. The gift card can also be marked with or have printed or affixed thereon a product or retailer name or logo. The gift card can also have a description of a gift item selected by the gift giver printed thereon or affixed thereto. In other embodiments, either or both of the greeting card and the envelope may also include product or retailer names, logos, or descriptions printed thereon or affixed thereto.

In another embodiment, the system may include only a gift card, a greeting card, and an envelope. In still another embodiment, the system may include only a gift card and an envelope. In still other embodiments, either or both of the greeting card and the instructions may be omitted. In one embodiment, the system can further include a receipt. In one embodiment, the gift card system can include an envelope that is manufactured around the gift card and other contents (e.g., greeting card, instruction sheet, and catalog) so that these items are enclosed within the envelope simultaneously with the manufacturing of the envelope.

The physical gift card can be a gift card constructed from paper, plastic, or another suitable material on which indicia may be printed, embossed, engraved, stamped, or affixed. The electronic gift card can be a downloadable file, a web page, a virtual card or an e-mail, any of which may contain alphanumeric text and other type characters, images, audio data, video data, or other types of data suitable for inclusion in or attachment to the electronic gift card. The gift card can be redeemable for a gift item. The gift item can be a good, e.g., a retail item such as a shirt or a television, or a service, such as, for example, a manicure or a golf lesson. In another embodiment, the gift card can be redeemable for money.

In embodiments in which the gift card is a physical gift card, the gift card can be a printable email card, a two-dimensional gift card, or a three-dimensional card. In one embodiment, the two-dimensional gift card can include a form that can features a single sheet having perforations to separate a detachable gift card, greeting card, and envelope. In another embodiment, the three-dimensional gift card can be pre-scored and/or pre-folded and may include a pop-up portion, which is folded in such a way that a portion of the card "pops up" or rises when the card is changed from a closed configuration to an open configuration. The pop-up portion of the card may include a photograph, e.g., a photograph of the gift giver, artwork, a logo, alphanumeric text, or any other desired information or images. The three-dimensional pop-up cards can be in the form of a greeting card or a business card and may also include a gift representation that visually represents a gift item selected by the gift giver for the gift recipient. The gift card may be custom designed for or by the gift giver or may be selected by the gift giver from among one or more templates provided by the card issuer.

The gift card can be personalized by the gift giver. The personalized gift card can be further customized using personal information of the gift giver and/or of the recipient. Personal information can include a name, address, location information, photograph, e-mail address, birth date, anniversary date, or other personally significant information related to either or both of the gift giver and the gift recipient.

The gift card system can further include a gift representation of at least one gift item. In an exemplary embodiment, the gift card system can include a plurality of gift representations each of which depicts a unique gift item. The gift representations can be depicted in the form of a photograph or a drawing of the gift item. In another embodiment, the gift representation can be a written or typed name of the gift item and may further include a written or typed description of the gift item. The gift representations can be displayed as part of a list or other collection of gift representations.

The gift representation may be displayed on printed material or electronically. For example, the gift representation may be printed in a magazine, a catalog, a brochure, or other printed matter. In another example, the gift representation can be displayed as an electronic image or text on a website or in an e-mail.

The gift card or a plurality of gift cards, e.g., a multi-pack, can be delivered to the gift giver who may select from among the gift cards, each of which may include a different gift representation, a gift item to be purchased for the gift recipient. The gift card or a package containing the plurality of gift cards can be delivered to the gift giver by direct mail or obtained by the gift giver at a retail store location. The gift card or package of gift cards can be delivered to the gift giver upon the gift giver's request or may be mailed or otherwise delivered to the gift giver unsolicited. The gift representations appearing on each gift card can be printed, embossed, engraved, or stamped onto each gift card. In another embodiment, the gift representation can be printed on a stamp having an adhesive backing that can be affixed to the gift card. In embodiments in which a gift card package is provided to the gift giver, the package may include a catalog that can contain a plurality of gift representations each of which is printed on a detachable stamp. The gift giver can select one or more gift items by detaching the gift representation stamp for each selected gift item and attaching the stamp or stamps to one or more gift cards to be delivered by the gift giver to the gift recipient.

The gift card system can also include a website having a graphical user interface (UI) that is accessible via a communications network such as, for example, the Internet. In other embodiments, the communications network can be a local area network (LAN), a wide area network (WAN), a global area network (GAN), an intranet, or another suitable communications network. The graphical user interface of the website can be capable of receiving information input or uploaded by a user of the website (such as, for example, the gift giver or the gift recipient) and of transmitting the information to a server. The server can be a remote server. The server can include a processor for electronically manipulating the data transmitted to the server via the website. The server can also include a data storage device, which serves to store information submitted through the UI and transmitted by software of the website to the server via the communications network. Information submitted through the UI and website can include personal information of the gift giver and gift recipient, credit card or other account number information enabling the gift giver or gift recipient to make a purchase, and photographs, images, audio files and video files permitting customization of the gift card or of a greeting card by the gift giver.

In one embodiment, the website can include account management features that permit the gift giver to transfer funds to the card issuer. The remote server connected to the global telecommunications network can be capable of storing funds data associated with the gift card. The funds data relate to the funds transferred by the gift giver to the card issuer.

The website can include a dynamic button navigation system permitting the user to easily and quickly navigate the gift representations representing gift items that are displayed on the website. The dynamic button navigation system can also be used by the gift giver or gift recipient to navigate between retailers whose products are available for purchase on the card issuer's website.

In one method, the gift giver can send a physical or electronic gift card to the gift recipient by purchasing the gift item and ordering the gift card using the gift card system website.

In another method, where the gift giver has received or obtained a physical gift card by direct mail or other delivery means, the gift giver may activate the gift card by funding the gift card to purchase the gift item represented by the gift representation thereon using purchasing features on the gift card system website. The gift card can then be mailed by the gift giver or otherwise delivered by the gift giver to the gift recipient. The gift recipient can then activate the card by accessing the system website, providing identifying personal information or a code provided by the gift giver, and using gift redemption features of the website to redeem the gift card for the gift or to select a different gift item than the one selected by the gift giver. In this method, the gift giver engages in a first (or purchase phase) activation of the gift card initially and the gift recipient engages in a second (or redemption phase) activation of the gift card to redeem the gift card for the gift item or for another item selected by the gift recipient.

In an exemplary embodiment of the gift card system, the gift card can include the unique card identifier. The unique card identifier may be a unique account or identification number (e.g., a series of alphanumeric characters such as a series of sixteen numbers), a unique bar code encoding a unique account or identification number, a chip storing and encoding a unique account or identification number, or another unique identifier that associates the gift card with an account of the user into which monetary funds have been deposited. The unique card identifier can also be associated with the user and the user's personal information.

In an exemplary embodiment, the unique card identifier can be a hexadecimal number, also known as a hexadecimal digit or hex number. The hexadecimal digit may be standard in that it may be represented by a combination of the numbers 0-9 and the letters A-F. The hexadecimal number may include a check digit that can be used to detect errors in the input of the hexadecimal digit, for example, where one digit of the hexadecimal number is mistyped.

The hexadecimal number can be used to identify the gift card, its original distribution method (e.g., direct mail or insertion into a publication), and the original recipient (i.e., the gift giver). The hexadecimal number can also be used by the gift giver to perform a first activation in which the gift card is activated and funded by the gift giver. The gift card can then be delivered to the gift recipient in a gift card package. If the gift giver is a new user, the website may prompt the gift giver to register to create a new account before permitting the gift giver to activate and fund the gift card.

Upon receipt of the gift card package, the gift recipient can access the system website and submit the same hexadecimal number to perform a second activation of the gift card that confirms receipt of the gift card by the correct intended recipient. During this second activation, the website may also provide the recipient with an option to send a printed or electronic "thank you" message to the gift giver.

In an exemplary embodiment, the hexadecimal number can be used in connection with internet-based transactions and gift redemptions conducted through the system website. In another embodiment of the system, the hexadecimal number can be submitted through the website and converted by software to a printable document that can be used by the gift recipient at a brick-and-mortar retail location having a POS system. Once printed, the printable document, i.e., the printed gift card, can include a bar code in which a standard sixteen-digit gift card number is encoded that will be accepted by a POS terminal. In another embodiment, the printed gift card can include the printed standard gift card number and no bar code. The hexadecimal number can also be used by system software to identify the user accessing the website so as to customize the website based upon data available that is related to the specific user.

The hexadecimal number may be printed or otherwise notated on or in a source such as, for example, the gift card, which can be either a physical card, e.g., a gift card constructed from paper or plastic, or a virtual gift card or "e-gift card." Hexadecimal numbers may also be printed on or in any of numerous other sources including, without limitation, catalogs, newspaper advertisements, catalog and newspaper inserts, brochures, magazines, conventional greeting cards, and virtual greeting cards or "e-greeting cards."

Each hexadecimal number can be unique and may be used as a primary identification ("primary ID") for one or more items of information. For example, the primary ID can be a name, address, e-mail address, telephone number, facsimile number, publication name, publication issue date, publication volume, card issuer name, account number, or any other item of information that identifies a person, entity, or publication. Publications may include, for example, brochures, catalogs, magazines, newspapers, and advertising inserts.

Each hexadecimal number can also be used as a secondary identification ("secondary ID") for one or more items of information. For example, the secondary ID can be the name of a publisher or retailer, an effective date, an in-house date, a publication date, a date of transaction, a source of a mail list, a recipient's name, a recipient's address, a recipient's e-mail address, a specific product, a gift giver's name, a gift giver's address, a gift giver's e-mail address, a type of transaction, or other information that can be used to identify the gift giver, the recipient, the publisher, or the retailer.

In an exemplary embodiment, the source can be an e-gift card that may feature the name and address of a direct mail recipient of the e-gift card as the primary ID. The secondary ID can be one or more of the publisher, the retailer, the specific product, the publication date of the publication, the date of the transaction, and the type of transaction.

In another embodiment, the source can be a virtual greeting card that may feature the recipient's e-mail address as the primary ID. The secondary ID can be one or more of the gift giver's e-mail address, specific product, publisher, retailer, date of transaction, and the type of transaction.

In another embodiment, the source can be a catalog such as, for example, a store catalog. The primary ID can be the name and address of the catalog recipient. The secondary ID can be one or more of the catalog publisher, retailer, in-house date, effective dates, the source of the mail list, specific product in the catalog, and recipient's e-mail address.

In another embodiment, the source can be a newspaper insert that may feature the issue date and publication volume as the primary ID. The secondary ID can be a specific product.

In another embodiment, the source can be a newspaper advertisement that may feature the issue date and publication volume as the primary ID. The secondary ID can be a specific product.

In another embodiment, the source can be a brochure and the primary ID can include the publication issue date and publication volume. The secondary ID can be one or more of a specific product, the publisher, the retailer of a specific product, the publication date, the effective date, the name and address of the brochure's recipient, and the recipient's e-mail address.

In still another embodiment, the source can be a magazine and the primary ID can be the magazine recipient's name and address. The secondary ID can be one or more of the magazine publisher, the in-house date, effective date, the source of the mail list, a specific product, and the recipient's e-mail address.

In yet another embodiment, the source can be a conventional gift card or conventional greeting card. The primary ID can be the card issuer name and an account number. The secondary ID can be one or more of the recipient's e-mail address, a specific product, the date of transaction, and the type of transaction.

The hexadecimal number can be used in conjunction with one or more computer databases to track the purchasing habits of consumers including both gift givers and recipients. The information obtained by the retailer, publisher, or advertiser using the tracking features can be used for predictive advertising in which related products are suggested to the gift giver or to the recipient after a first product is purchased. For example, the system may use data related to a gift giver's purchase of a birthday gift for a recipient during the previous year to recommend products or services for purchase by the gift giver for the recipient's birthday during the current year. In one embodiment, the hexadecimal number can be used in connection with social networking websites such as, for example, Facebook™ or MySpace™, to obtain information and data pertaining to the users of the social networking website. The data and information obtained may relate to advertisements viewed within the social networking website by its users. This user data and information can be compiled in a computer database and linked to products or services that can be displayed in advertising targeted to and customized for specific individuals or groups of individuals.

In another embodiment, the unique identifier can be a stock keeping unit (SKU) where each product is assigned a separate and unique SKU. The SKU can be a universal SKU system that may be used to identify products by multiple retailers or manufacturers rather than a conventional SKU that uses digits assigned by each retailer or manufacturer using its own numbering system. The hexadecimal number can be used in place of the SKU or in combination with the SKU.

In one embodiment, a hexadecimal number appearing in a catalog or other publication, once entered into the system by the user using the system website, can be used by the system to identify the user and the publication, for example, where the publication is a subscription sent regularly to the user. The catalog can further include unique SKU's each of which identifies a unique retail item or service or gift item displayed in the catalog. The user can select a gift item or retail item or service for purchase by entering the item's associated SKU into the UI of the website. The system then directs the user to a web page of the website that provides information about the selected item as well as purchasing options.

The hexadecimal number associated with a gift item appearing in a publication can be entered into the website's UI by the user, which is then identified by the system and matched with the location or IP address of a specific web page on the retailer or card issuer's website that can display an image of the gift item and a description of the gift item. The system associates the hexadecimal number with the user so that the system can track, among other data, the user's history concerning publications read by the user, products viewed on the system website by the user, and products purchased through the system website by the user.

The gift card can be used by the gift giver to make a monetary gift to the recipient that can be used to purchase goods or services from a specific retailer, manufacturer, or service provider, or, in one exemplary embodiment, to make a gift to the recipient that is a specific good sold or produced by a specific manufacturer or retailer or a specific service provided by a specific predetermined service provider.

For example, the gift card could be for a specific magazine subscription, a specific perfume, or a specific set of golf clubs. The gift card could also be redeemable for a service such as a manicure or trip to a day spa. The gift card may include a photograph or other image of the gift selected by the gift giver for the recipient. The gift card may further include a web address for the card issuer's website where the recipient can redeem the gift card. The gift card can also feature the purchase price or fund amount of the card so that the recipient will know the amount of funds available to use for purchases made when redeeming the card. The gift card can be obtained by the gift giver from a card issuer, who may be a retailer, manufacturer, advertiser, or a third party working on behalf of the retailer, manufacturer, or advertiser.

The gift card system also includes means for the gift giver to deliver the gift card to the recipient. The delivery means can be a separate envelope into which the gift card can be inserted, an integrated gift card-envelope combination, or an email or other electronic or digital delivery means that can be viewed on a display monitor and/or printed by a printer connected to a computer.

The gift card may be a stored-value card that includes a magnetic strip to encode the card number and funds data. In an exemplary embodiment, funds data is the amount of money transferred to the card issuer by the gift giver to fund the card. The funds data can be physically stored as data encoded on a magnetic strip of the gift card, however, in an exemplary embodiment, the funds data is stored on a remote server that is accessible via a global telecommunications network. The remote server can be maintained by an issuer of the card.

Figure 9A:
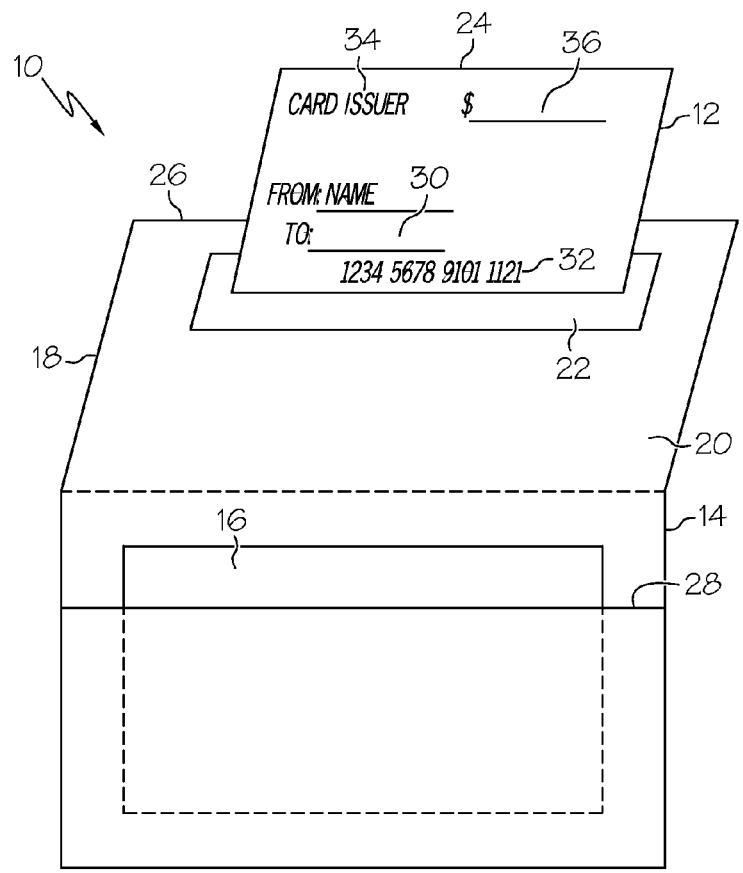
FIG. 9 is a front planar view of the combined gift card and envelope with the envelope shown containing a separate detached brochure.
Figure 9B:
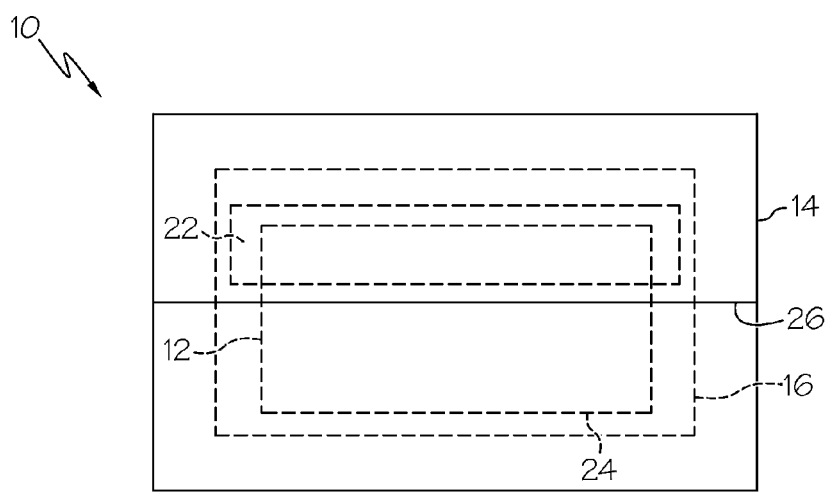

In one exemplary embodiment, the gift card can be a paper card. The paper gift card may be a closed-end mailer that includes a combined envelope to which the card is connected for mailing by the gift giver to the recipient. The combined gift card and envelope can be a single unitary piece and may also include a separate brochure as shown in FIG. 9. The envelope may include a bar code to enable tracking by the card issuer of the individuals to whom each gift card is sent, particularly when the gift cards are distributed unsolicited inside magazines, attached to packaging, or by broadcast mass-mailings or emails. The brochure can be used to provide directions to the gift giver concerning how to fund the gift card or directions to the recipient regarding how to redeem the card. In another embodiment, the brochure can include advertising information related to other products or services sold or provided by the card issuer, retailer, or manufacturer.

In another embodiment, the gift card may also include a portion that is a greeting card or, in another alternate embodiment, the gift card can be a greeting card that includes a unique card identifier, e.g., a hex number or a gift card number, that permits the card to be funded securely by the gift giver and securely activated and redeemed by the intended recipient.

The paper gift card can be in the form of a coupon or as part of a packaged envelope, card, and advertising information that can be mass-distributed by mail either randomly or through targeted mailings to specific individuals or households. The coupon version of the gift card can include a card number to permit funding of the card by the gift giver and activation of the card by the recipient at a retail location or online through the card issuer's website. The gift card can be used and delivered to a gift giver as a stand-alone brochure, a package insert, or a direct mail piece. In another embodiment, the paper gift card can be inserted unattached or bound into a magazine, catalog, newspaper or other publication that is will be purchased or viewed by individuals of unknown identity. In still another embodiment, the gift card can be predictive in nature, for example, where the card issuer obtains information from retailers or another source related to an individual's contact information and shopping preferences to distribute the card to a targeted set of individuals.

As shown in FIG. 9, the paper gift card can be connected to a tongue of an envelope that can be delivered via mail or other delivery means. The envelope can be oriented in an open configuration so that contents of the envelope such as, for example, the gift card, gift card instructions, a catalog, a brochure, or a greeting card, can be accessed by the recipient. The envelope can also be oriented in a closed configuration to enclose or seal the contents inside the envelope. The gift card can be detachably connected to an inner surface of the envelope's tongue by an adhesive. The gift card may comprise an affixed portion attached to the envelope tongue by the adhesive or other attachment means. The gift card and affixed portion may be separated by a perforation that permits the gift card to be detached from the affixed portion by tearing. The gift card can be sized and attached to the inner surface of the envelope tongue in such a way that a top edge of the gift card may extend further than and hang beneath a bottom edge of the envelope tongue. The gift card can be inserted into a pouch (or interior space) of the envelope when the envelope is oriented in the closed configuration. When the envelope tongue is grasped and opened by the gift giver, the gift card is pulled out of the pouch of the envelope so as to be visible to the user.

The gift card may further include space to write or print the gift recipient's name. Once the gift giver has detached the gift card from the affixed portion, the gift giver may insert the gift card into the pouch of the envelope and then seal the envelope in a sealed configuration for delivery to the gift recipient.

In another embodiment, the gift card can be detachably connected to the envelope via perforations. The gift card can remain entirely or partially exposed outside of the envelope's pouch when the envelope is oriented in the closed configuration so as to be visible. When the envelope tongue is oriented in the closed configuration, the gift card can still be visible to the user because the gift card may protrude from and hang beneath a bottom edge of the envelope tongue. After the gift card has been activated and funded, the gift giver can detach the gift card from the bottom edge of the envelope tongue and insert the card into the envelope which can be sealed in the closed configuration for delivery to the gift recipient.

In another embodiment, the envelope tongue can further include a detachable portion or stub connected to a bottom edge of the tongue. The detachable portion can include an image or description of the gift item purchased by the gift giver and redeemable by the gift recipient using the gift card enclosed within the envelope. The detachable portion may be detached by the gift giver and discarded or detached and retained by the gift giver as a record of the gift item purchased for the gift recipient.

In one embodiment, the paper gift card can be attached to a box, for example, to the top of a pizza box, or to other packaging in which a product is delivered to consumers. The paper gift card can be attached to the box or other packaging by a magna-strip or other resins or glues, although any suitable attachment means may be used for the purpose. Magna-strips may also be utilized to attach the gift card inside, on, and to magazines and other publications.

In another embodiment, the gifting system may use a multi-pack, which can be a package or envelope containing multiple gift cards for a plurality of products or services or from a plurality of retailers or manufacturers. The multi-pack can be delivered to the consumer, e.g., by direct mail, so that the consumer can browse the gift cards and select one or more to activate and fund for gifting to a gift recipient. The gift giver's opportunity to select one or more gift cards for activation and gifting to a recipient from among the plurality of gift cards contained by the multi-pack provides a type of "gift card mall" experience that is delivered directly to the gift giver's home. The gift giver can select a gift from among the gift representations provided in the multi-pack and activate and fund the gift card via the website from a location and computer that is convenient for the gift giver. The multi-pack can be mailed to a consumer upon the consumer's request or can be mailed to a group of consumers whose contact information is obtained from a mailing list compiled or acquired by the card issuer or advertiser.

The multi-pack and the plurality of individually unique gift cards contained therein can be manufactured using a single stream in-line process, by a sheet-fed operation, manually, or by any other suitable printing and folding means. To efficiently create the multi-pack, a variable printing machine may be used to print unique cards sequentially via inkjet printing means. The sequential printing feature of the printer allows a single set of a plurality of unique gift cards, e.g., gift cards for a plurality of different gifts or from a plurality of different retailers or manufacturers, to be printed as one sequential set that can be packaged together rather than requiring printing and subsequent collation of the different cards. The gift cards can be variably printed so that each card differs in the name of the consumer, the gift representation, the retailer, or the manufacturer printed on each card in the set that is to be packaged. In this way, each consumer can receive a multi-pack that is individually personalized for the specific user and which can contain gift cards that are the same as or different from those contained in any other multi-pack. Personalization of each multi-pack for each specific user can be accomplished using personal information contained in a database related to each user. The printing machine can collate the cards automatically rather than requiring each set of identical gift cards to be separately printed and subsequently collated by manual or mechanical means. In one embodiment, the multi-pack may also contain one or more mailable greeting cards and envelopes in addition to the plurality of gift cards. In another embodiment, the multi-pack can be made available for pick-up by gift givers in a retail location. Each gift card in the multi-pack may include a unique hexadecimal number, standard gift card number, and/or bar code printed thereon. Other information can also be printed on each unique gift card within the multi-pack to further personalize the gift card such as, for example, the gift giver's name and address, the product name or product image, and product information. Similar personalized data can be printed on the greeting card in embodiments in which the multi-pack contains one or more greeting cards.

In another exemplary embodiment, the gift card can be digital or electronic. For example, the gift card may take the form of an email that includes a unique card identifier. The email may be printable so that once sent by the gift giver to the recipient, the recipient may receive, print, and use the gift card to make a purchase. The electronic gift card may be designed by the gift giver using design features available on the website. For example, the website may permit the gift giver to include a photograph of the gift giver on the gift card.

As shown in FIGS. 1-5, 6A-6C, and 7-8, the invention also features a method in which a gift giver creates and logs into an account on a card issuer's website and accesses account features on the website that enable the gift giver to order, personalize, fund, address, and send a personalized gift card to a recipient. Once the gift card has been purchased, the website may generate a receipt, which can be an animation, to notify the gift giver that the purchase transaction has been completed and that the gift card will be delivered to the recipient. The receipt may be delivered to the gift giver in an email. Upon receipt of the gift card, which may be a printed paper gift card that is mailed or otherwise delivered or an electronic gift card (or e-gift card or e-card) that is emailed or otherwise electronically transmitted to the recipient, the recipient can redeem the gift card by accessing the card issuer's website and following instructions provided therein to activate the card. In another embodiment, the recipient can activate the card via a telephone system of the card issuer.

In embodiments utilizing the e-gift card, the e-gift card may include a link to an advertisement for the gift item or for other products or services sold by the gift item's retailer. In another embodiment, the advertisement may be attached to the e-gift card as a separate file, which can be a multimedia file.

The gift giver may register for access to the website, and once registration is completed, may receive a log-in or username as well as a personal identification number (pin) or password to access the website. Personal information entered by the gift giver during registration can be saved on a remote server maintained or controlled by the card issuer. The gift giver may choose a gift to be purchased and given to the recipient as a gift card that can be redeemed online or at a retail store. To send a gift card to the recipient, the gift giver must enter predetermined personal information related to the recipient, which can also be stored on the remote server. The website may generate a password that can be provided to the recipient to activate the gift card online, by telephone, or at a retail store to redeem the gift card for the gift. In another embodiment, users can access the website without being required to use a password.

In another embodiment, the method includes a step wherein the recipient must also register for access to the website, thereby providing certain predetermined personal information, to activate the gift card. Once the recipient has registered and logged in to the website, the recipient may activate the card to redeem the gift. If the recipient accepts the gift, acceptance confirmation may be provided. Shipping confirmation may also be provided via the website, email, or mail where the gift is to be shipped to the recipient rather than received at a retail store.

The website may include an avatar created from software that generates a human voice to orally describe the products being advertised, provide instructions, greet the individual accessing the website, provide gift card delivery status, or provide information pertaining to points or rewards earned through use of the card issuer's website. The avatar and its related software can provide dynamic personalization to user account accessible via the website by communicatively linking the avatar software to a database stored on a server. The database can include user information such as, for example, the user's name, address, birth date, anniversary date, and other personal information that is associated specifically with the user. The system can include text-to-speech software that converts text entered into the system and preselected user information obtained by the avatar software from the database into an audio file that sounds similar to or mimics a human voice. The avatar's speech can include reading or playing aloud the website user's name as part of a greeting message to the user. In another example, the audio file which appears to be spoken by the avatar can include a birthday greeting message on or around the time of the user's birth date.

In one embodiment, the system may use data related to the user's shopping interests and previous purchases to suggest gifts through information "read" aloud by the avatar. For example, if the user/gift giver is shopping on or around the time of Mother's Day, the system by means of the avatar speech can recommend a gift to the gift giver similar to the gift that the gift giver purchased for the gift recipient the previous year. In another embodiment, the system's avatar may recommend a variety of gifts for purchase by the gift giver which are appropriate for the occasion. For example, if the gift giver is shopping on the website for a female gift recipient's birthday gift, the avatar may "read" descriptions of one or more gift items such as, for example, jewelry or women's perfume. In this way, the appearance and content of the website's web pages and content can be customized to be predictive based upon the user's history and habits recorded by the system during the user's previous visits to the website.

If the gift giver has selected a particular gift for the recipient, which can be indicated in information provided on the gift card, and if the recipient desires a different gift than the one selected by the gift giver, the recipient may choose a different gift of the same or a lesser value by accessing the card issuer's website and following instructions provided therein for changing the gift selection.

In another embodiment where the card issuer is a brick-and-mortar retailer, the recipient may redeem the card to receive the gift by visiting one of the retailer's store locations.

The invention also relates to a method for gifting and advertising. In one step of the method, when the recipient accesses the card issuer's website to activate the gift card, the recipient will have the option to send a thank you message, which can be delivered via email, to the gift giver.

In one embodiment of the method, the website may be customized to have a different appearance or to contain different content, for example, advertising content, for each gift giver and recipient that accesses the website. Advertisements on the website can be linked or hosted.

The invention also relates to a method of gifting that can include the use of a unique card identifier that can be an alphanumeric identifier such as, for example, a hexadecimal number, stock keeping unit (SKU), or standard gift card number (e.g., a standard sixteen-digit gift card number), or the unique card identifier can be a bar code having any of the aforementioned identifiers encoded thereon. The method can include the step of providing a printed material including a plurality of gift representations each representing an actual gift item. A unique printed alphanumeric identifier stored on a server can be assigned to each of the plurality of gift items represented by the plurality of gift representations. The method can be used to associate tracking data with each alphanumeric identifier. The method can also provide a website that is connected to the server via a communications network by which a user can purchase at least one gift item selected from among the plurality of gift representations appearing in the printed material. The user can be required to enter the alphanumeric identifier assigned to the selected gift item into a graphical user interface of the website. The method can also require the user to provide personal information through the graphical user interface of the website. The alphanumeric identifier can be associated with the user, e.g., in a database in which alphanumeric identifiers are each associated with one of a plurality of users.

Where a hexadecimal number or SKU is used, the method may include the step of converting the alphanumeric identifier into a standard sixteen-digit gift card number that is acceptable at POS terminals in retail locations.

The method can also include the step of analyzing the tracking data, personal information, browsing habits, and shopping habits of the user collected during the user's access to the website to determine the user's predicted shopping preferences. Advertisements may be presented to the user based upon the user's predicted shopping preferences.

The method may include the step of purchasing a gift item through the website to be gifted by the user to a gift recipient, wherein the user is a gift giver. Another step of the method can include delivering a gift card to the gift recipient. The gift card can feature a gift representation of the actual gift item selected and purchased by the gift giver. The gift card may be redeemed for the actual gift item by the gift recipient providing the gift recipient's personal information through the graphical user interface of the website.

The method can be used to record data related to the shopping and purchasing activities of the gift giver and gift recipient accessing the website. Using the recorded data, gift items can be suggested to the gift giver for purchase by the gift giver during the gift giver's subsequent visits to the website based upon the gift giver's shopping and purchasing activity data during previous visits to the website. The gift recipient may redeem the gift card for the gift item selected and purchased for the gift recipient by the gift giver. Alternatively, the gift recipient may reject the gift item selected and purchased by the gift giver and to select a different gift item chosen by the gift recipient.

The invention also relates to a method that can be used to advertise and promote retail goods and services through gifting. Once the user, e.g., a consumer, a gift giver or a gift recipient, has accessed the system website, the user may elect to play and view an advertisement, which features information related to a retail item. The retail item can be a good or a service. Through the website, the user can then be asked or presented with a series of questions related to the retail item. The user can be awarded points based upon the number of questions answered correctly by the user. The user may then redeem the points awarded by the system for a reward item. The reward item can be a downloadable movie, a downloadable song file, a downloadable audiobook, a pay-per-view movie, a downloadable image file, a downloadable computer screen saver, a downloadable video file, or a movie rental voucher. The method can permit a gift giver to gift points earned or a reward item selected by the gift giver to a gift recipient.

In another step of the method, when gift givers and recipients access the card issuer's website they may be shown advertisements and other marketing information provided by the card issuer, retailers, and/or manufacturers. The advertising information may be provided as video and/or audio presentations, still photographs, and/or text advertisements. The advertising information can also be provided through games in which the gift giver or recipient answers questions to earn points that are redeemable for rewards. Where the website is operated by a third party and not by one or more retailers or manufacturers, the retailer and/or manufacturer may pay for the rewards earned by users of the website. The questions on the website may be directed to information about the retailer and/or manufacturer's products. Consumers can be rewarded or paid to watch advertisements. A consumer may earn reward points by watching advertisements on the website and answering questions about each advertisement correctly. The consumer may also be awarded points for making purchases through the website including gift card purchases. The number of points awarded may also be dependent upon another variable such as the number of seconds of advertising watched while the gift giver or recipient is accessing the website. Examples of rewards that may be earned through the game-like advertising on the website include streaming and downloadable movies that can be viewed online, pay-per-view movie credits, music downloads, gas credits, or any other suitable product or service. In one embodiment, the interactive gifting system permits the consumer to select the advertisements that he or she watches.

The method can include the step of using the system to record the number of correct and incorrect answers provided by the consumer. Other information such as, for example, information concerning the specific questions answered correctly or incorrectly by the consumer can also be recorded. In this way, more points may be awarded to the consumer for answering certain questions correctly than other questions. Because the method incorporates these data mining features that are recorded in association with the identity and personal information of a specific consumer, advertisers can receive more viable, and valuable, leads related to individuals to which the advertiser should target its advertisements and promotions.

The method and systems related thereto are viral in that one consumer can refer another consumer to the website for the system. In one example, the referral is accomplished by a gift giver delivering a gift card to a gift recipient so that the recipient is directed to the website by instructions included with the gift card in order to redeem the gift. Once the recipient accesses the website, in addition to redeeming the gift card for a gift item, the recipient may also engage in game play of a commercial game, e.g., watching advertisements on the website and answering questions concerning those advertisements to earn reward points that are redeemable for a retail good or service. The method can also include steps in which a first consumer refers a second consumer to the website by emailing a link to the website, by word-of-mouth, or by submitting the second consumer's e-mail address or other contact information through the website to allow the system to generate an e-mail, direct mail, or other communication to the second consumer with information related to the game and reward point system.

Commercial Game

Figure 10:
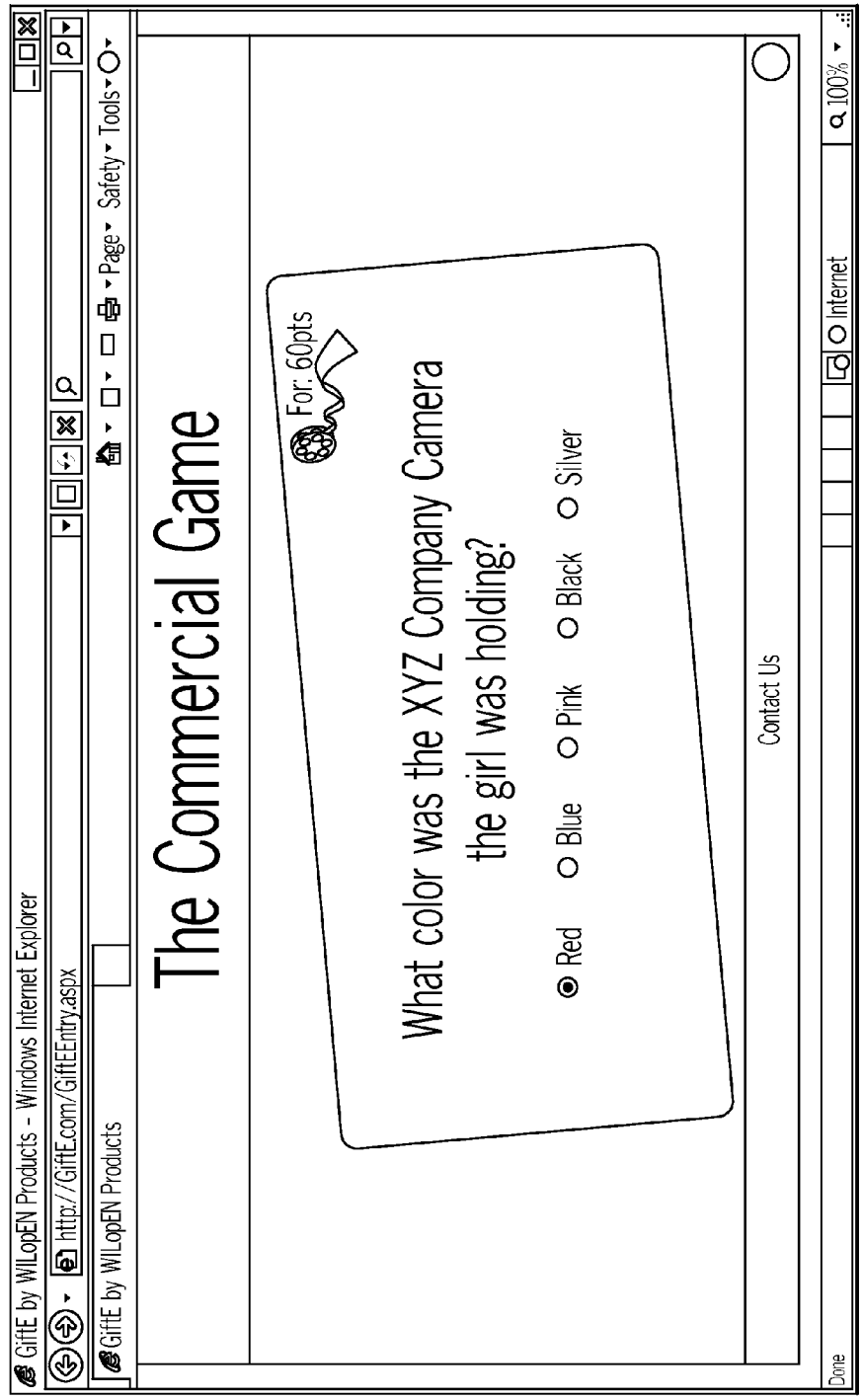
FIG. 10 is an example of a screen shot of a question and answer selections of the commercial game system that could be accessed on a web browser software program installed on a computer connected to a telecommunications network.

The commercial game system can be used to encourage consumers to watch one or more advertisements as part of a commercial game. After viewing an advertisement, the consumer is presented with one or more questions related to the content of the advertisement as shown in FIG. 10. The consumer is directed to answer the question. In an exemplary embodiment, the consumer can select an answer to the question from among several answer choices, e.g., 2, 3, 4, 5 or more answer choices. In another embodiment, the consumer may be directed to answer the question by spelling the answer by selecting letters or numbers from an alphanumeric visual keyboard that can be displayed on a computer or television. The commercial game can be presented and viewed through cable or satellite television, a computer connected to a telecommunications network, e.g., the Internet, or web-enabled television. The commercial game features selection control features that permit the consumer to select an answer to the questions presented. The selection control features may be web control icons and "buttons" to which a pointing device (e.g., a computer mouse) may be pointed and clicked to select an advertisement to view, to select an answer to the question, and to select the reward desired by the consumer after viewing one or more advertisements. In embodiments in which the commercial game is presented via television, a remote control's directional and selection buttons may be used to select an advertisement to view, to select an answer to the question, and to select the reward desired by the consumer after viewing one or more advertisements.

In an exemplary embodiment of the commercial game system, the commercial game is a question-and-answer game. The commercial game promotes a behavior in which consumers are encouraged to pay close attention to advertising because they may receive a reward for answering questions related to the advertisements or commercials that they view. In one embodiment, the commercial game can be presented as a virtual cross-word puzzle; a scrambled word game in which letters are unscrambled by the consumer to spell the answer; a word search game in which letters arranged in a box, square, or other border or pattern can be selected or circled using the pointing device to select the answer to the question; and any other suitable game in which the consumer can select a word, number or numbers, letter or letters, or phrase that spells the answer to the advertisement-related question presented to the consumer by the system.

By engaging the consumer in a game in which the consumer can answer questions related to advertisements (e.g., multimedia commercials) the consumer watches, the consumer is provided an incentive to watch the advertisement, to pay closer attention to the advertisement, and to compare the product promoted in the advertisement with other products. For example, the commercial game include content that encourages or enables the consumer to compare multiple products sold by a retailer or to compare products made by one manufacturer with other similar products made by the manufacturer's competitors. In this way, the commercial game system educates the consumer about the products being advertised in a manner that can be monitored by a system administrator to collect data for the benefit of an advertiser. The advertiser can be a retailer or a manufacturer.

For watching advertisements and interacting with the system by answering questions related to the advertisements watched, the commercial game awards the consumer with a reward item that can be monetary or selected from a group of immediately available viewable services. Reward items that are services or service-related can include pay-per-view movie credits, cable television service credit, satellite television service credit, online television service credit, telephone service credit, online game play credit, concert tickets, broadband service credit, premium television channel service credit, satellite radio service credit, on-demand television service credit, music downloads, movie downloads, video game plays, video game downloads, gas credits, airline miles, a downloadable publication, a downloadable video, a downloadable music file, a downloadable audio file, a downloadable audiobook, a streaming video file, a streaming audio file, a downloadable image file, a downloadable computer screen saver, a downloadable video file, a movie rental voucher, and other suitable retail goods and services. Many of these reward items are intended to provide instant gratification to the consumer because they can be downloaded for immediate use or accessed immediately via the Internet. Unlike other loyalty systems that force the consumer to accumulate points over time and that allow the consumer to redeem those accumulated points only after accruing a predetermined amount, the commercial game is designed to offer immediately available rewards, thus offering instant gratification to the consumer.

Figure 11:
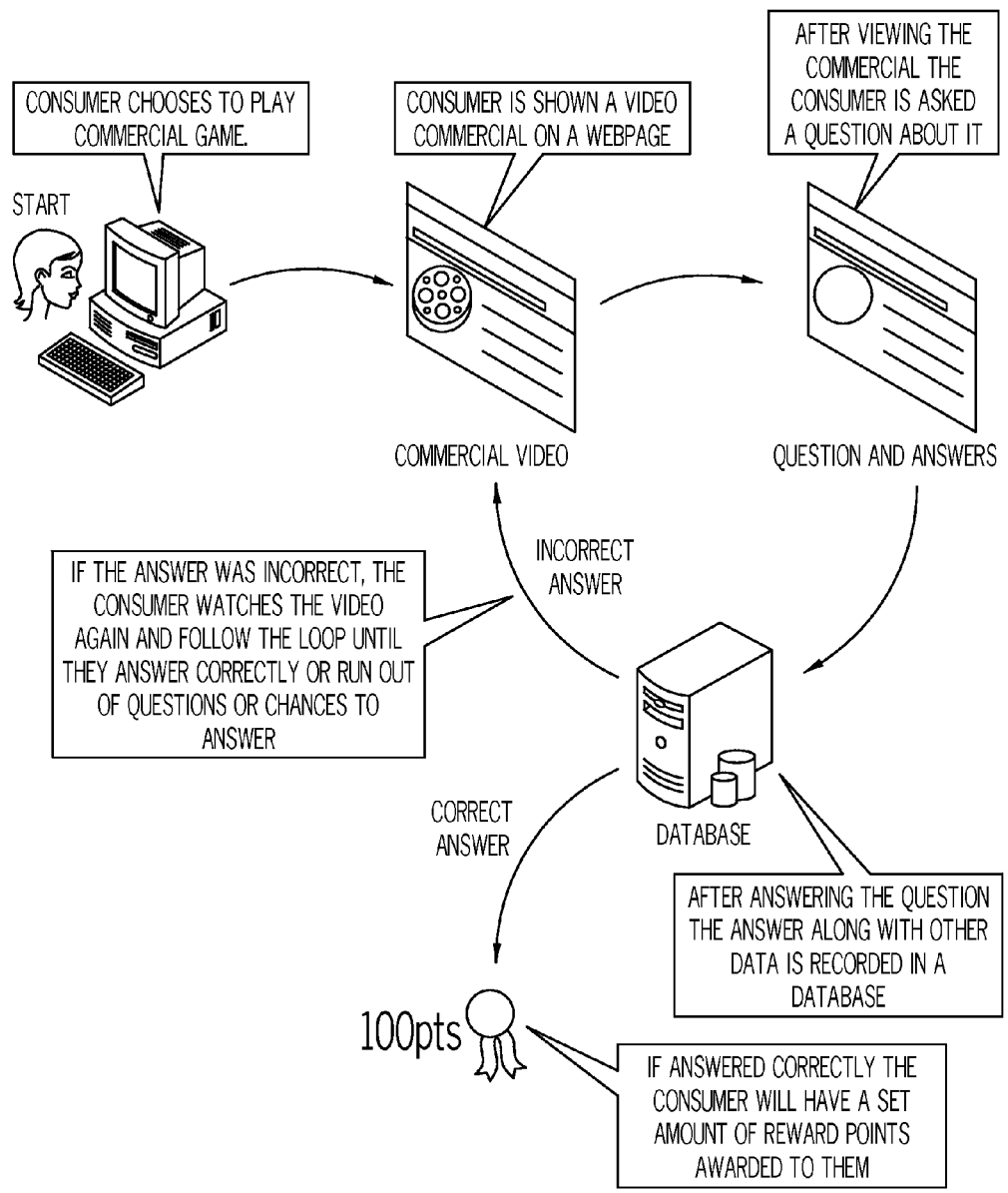
FIG. 11 is a flow chart showing a commercial game system.

In one exemplary embodiment (for example, as shown in FIG. 11), rewards can be reward points that are redeemable for any of the aforementioned services or service-related items. In addition to awarding reward items or reward points to the consumer for viewing and answering questions related to advertisements, the commercial game system may also award additional points to the consumer for purchasing goods or services advertised and sold on the website of the system.

FIG. 11 shows one exemplary embodiment of the commercial game system. First, a consumer chooses to play the commercial game via access through a computer. Next, the commercial game system displays a video commercial on a webpage in a web browser program or media player software program displayed on a display screen connected to the computer so that the consumer may watch the commercial. After the commercial has ended, the system presents one or more questions to the consumer and directs the consumer to provide or to select an answer to each question presented. If the consumer provided an incorrect answer to the question, the system allows the consumer to watch the video commercial again repeatedly (i.e., in a loop) until the consumer answers the question correctly or until the system does not provide the consumer any additional questions or chances to answer. If, on the other hand, the consumer answers the question correctly, data (e.g., data related to the consumer, the consumer's answers as well as the questions presented, and the rewards earned by the consumer) is recorded in a database on a remote server communicatively connected to the computer by a telecommunications network. The system awards the consumer a predetermined number of reward points for the question or questions answered correctly, which may be redeemed for reward items provided by a retailer, manufacturer, advertiser, or the commercial game administrator.

In an exemplary embodiment, the consumer views the advertisements on a website. The website can be operated by the advertiser or by a system administrator on the advertiser's behalf When the consumer visits the website using a software browser program installed on the computer, the consumer can be prompted to register for an account with the system if the consumer is a new user. If the consumer is an existing user of the system, the commercial game system can prompt the consumer to log into the consumer's account. Once logged into the system, the consumer can be permitted to opt out of the commercial game and may proceed to shop for products sold through the website. If the consumer opts out of the commercial game, advertisements may or may not be shown to the consumer; however, no rewards will be awarded to consumers who opt out of participation in the game.

As the consumer views advertisements and answers questions concerning the products promoted in those advertisements, the system collects and stores data in databases on at least one server located remotely from the computer from and through which the consumer watches advertisements and transmits answers. The system provides a plurality of multimedia advertisements, or commercials, from which the consumer can select for viewing using the selection control features of the system. The system can permit the consumer to view advertisements for products in which the consumer is interested. In another embodiment, the system can select some or all of the advertisements that the consumer must view to participate in the commercial game to earn rewards.

The data collected by consumer usage of the commercial game can be used by the advertiser for any suitable purpose including but not limited to testing the effectiveness of a particular advertisement, determining consumer interest in an advertised product, and developing targeted advertisement campaigns that are personalized relative to each particular consumer's own shopping interests, habits, and history.

The system can permit the advertiser to create as many questions related to an advertisement as the advertiser wishes. In an exemplary embodiment, questions can be created and entered into the system along with the uploaded advertisement by the advertiser or by a person acting on behalf of the advertiser. Submission of questions and uploading of the advertisement can be controlled by the advertiser (e.g., a retailer or a manufacturer) using an automated upload software module that is part of the commercial game system.

Using the system, the advertiser can offer one or several commercials for the consumer to view. Alternatively, the advertiser could opt to show the same advertisement to the consumer repetitively (e.g., one, two, three, four or more times) with new questions related to the advertisement presented to the consumer for answering after each viewing of the advertisement.

Consumers will enjoy participating in the commercial game because, from the consumer standpoint, the consumer is being paid or earning rewards for viewing advertisements.

In an exemplary embodiment, the commercial game system will award a reward or points that are redeemable for a reward to the consumer for correct answers to questions presented concerning the advertisement that is viewed. In other embodiments, points or rewards may also be awarded to the consumer based on one or more of the following criteria: the number of questions answered correctly, the amount of time the consumer spends watching advertisements, for viewing more than a predetermined number of advertisements (e.g., more than one advertisement), for purchasing a specific good or service featured in one of the advertisements watched, or for purchasing a good from a featured brand shown in one of the advertisements watched.

The value of a reward point can be set by the system administrator or by each advertiser using the system to advertise and sell products and services. The reward points can be used as a type of on-line or virtual currency to exchange or redeem for goods or services by the consumer. In one embodiment, points are earned at the rate of one point per second for watching an advertisement. In another embodiment, one point may be awarded for every dollar spent by the consumer purchasing products or services on the website. Both of these embodiments may be implemented in the commercial game system to provide consumers with two ways to earn points. The point-to-dollar value ratio can be different for earning points than the ratio is for spending points to redeem the points for reward items.

Using the example above, if the consumer watched a 30-second advertisement and answer the questions that follow correctly, the consumer would earn thirty points. If the consumer then purchased a product sold on the website for $100.00, the consumer would earn an additional 100 points for a total of 130 reward points. The spending value for these points can vary. For example, if the spending value of a point is equal to one-half cent per point, the 130 points would equal 65 cents of spending value. If the advertiser set the point value equal to one-quarter cent per point, the spending value of 130 points would be 32.5 cents. The advertiser may set different values for points depending on whether they are earned by watching commercials, answering questions correctly, re-answering questions that are answered incorrectly to begin with, or purchasing products advertised and sold on the website.

If the consumer selects or provides an incorrect answer in response to a question presented concerning a commercial that the consumer watched, the commercial game system may permit the consumer to view the commercial a second time. The system can present the user with a question or set of questions different from the question or questions presented to the consumer for answering after the consumer's first viewing of the commercial. If the consumer again answers the question or questions incorrectly, the system may permit the consumer to view the commercial again for a third, fourth, fifth, or more time. Each time the same commercial is viewed again by the consumer, the system may repeat the same questions presented to the consumer for answering after the first viewing or the system may present entirely new questions each time the commercial is viewed again after the first viewing.

If the consumer selects or provides an incorrect answer in response to a question presented concerning a first commercial, the commercial game system can also present a second, different commercial for viewing by the consumer. After viewing the second commercial, the system may present questions to the consumer for answering that are identical to the questions presented to the consumer after viewing the first commercial.

The commercial game system can store the questions and answers to the questions in a database on the server. The advertiser can supply both the questions and the answers, which may be electronically uploaded into the system via the telecommunications network. In another embodiment, the questions and answers can be created by the system administrator or another person on the advertiser's behalf and saved and stored in the database located on the server.

The commercial game system can save the commercials, or advertisements, and questions and answers in any combination and can present the commercials, questions, and each question's corresponding answer in any order. In some embodiments, the system may provide the consumer with the correct answer when a question is answered incorrectly. In other embodiments, the system may not provide the consumer with the correct answer when a question is answered incorrectly.

In one embodiment, the commercial game system can be an animated game that can include animations such as, for example, a cartoon.

The commercial game system can present questions' answer selections in the same format or the system can present a combination of answer selection formats. For example, the answer selection format can be fill-in-the-blank so that the user is prompted or required to type an answer into an answer submission field. In another example, the answers to each question can be presented in multiple choice format so that the user is required to select a correct answer using the pointing device.

The commercial game system can be programmed to permit the advertiser to value the consumer in relation to the reward points earned by the consumer. For example, if the consumer purchased a product on the website costing $100.00 as in the example above, the advertiser can set the reward point value to encourage more purchases by the consumer or, alternatively, to make the point-to-dollar value ratio higher so that the consumer must accumulate a larger number of reward points to be able to redeem the points for a reward item.

The commercial game system can include links to web pages hosted either on the website of the system administrator or on a different website operated by the advertiser. The links can be followed by pointing the consumer's web browser to the web page located at the link if the consumer desires to read more information concerning the advertised good or service. The commercial game system may also be used to encourage consumers to read printed advertisements created by the advertiser. Multi-channel distribution methods can also use printed materials to drive consumers to the website of the commercial game system. These printed materials can include the placement of multi-packs inside shopping bags given to customers at retail locations. The printed materials can also be distributed at kiosks. The printed materials can be brochures, which explain that the commercial game system allows the consumer to accumulate reward points for viewing advertisements and for purchasing goods or services on the website.

Extra reward points may be awarded to the consumer for watching advertisements related to a specific product or for participating in a special promotion offered by the advertiser. For example, a retailer could offer to award double the usual number of reward points for watching an advertisement about a specific product.

Reward points may also be transferred or gifted to another person by the consumer. The person receiving the gifted reward points can then register to create an account with the website and can also participate in the commercial game or redeem the reward points for a reward item.

After the consumer has played the commercial game, the consumer can visit a rewards section of the website to select a reward for which the earned reward points can be redeemed. The consumer may also elect to purchase a good or service on the website as a result of the information learned by the consumer when watching advertisements on the website. Data mining techniques can be used to personalize offers from the advertiser to the consumer. If the consumer uses any of the forms described herein, the information obtained using the commercial game system's data mining features can be used to print additional advertising information on the form that is specific to the consumer's interests.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An interactive commercial game system that allows a user to answer advertisement related questions generated by an advertiser whereby correctly answered questions are awarded predetermined point values based on a predetermined set of value criteria that are redeemable for predetermined entertainment products, said system comprising:
a server connected to a communications network;
electronic media connected to the server on which recorded advertisements are stored for playback to a user;
a media player device communicatively connected to the server via the communications network further comprising a display screen for playing the recorded advertisements for viewing by the user;
software installed on the server for transmitting questions related to the advertisements that are viewable on the media player device;
a control device communicatively connected to the media player device comprising control features for entering an answer to questions transmitted by the server;
software installed on the server for determining whether answers entered by the user and transmitted to the server are correct;
software installed on the server for calculating, recording, and displaying the number of points awarded to the user for answering questions correctly, the number of advertisements viewed, the length of time advertisements are viewed, the number of attempts at answering each question before providing the correct answer, for purchasing a specific good or service featured in one of the advertisements watched, or for purchasing a good from a featured brand shown in one of the advertisements watched, wherein the advertiser may set different values for points earned depending on whether the points are earned by watching advertisements, answering questions correctly, re-answering questions that are initially answered incorrectly, purchasing products advertised and sold on a particular website or earned by a user whose point value was determined by evaluating the user's prior earned points and awarding a predetermined point value based the reward points already earned by the user; and a plurality of goods and services for which the points earned by the user while viewing advertisements and answering questions are redeemable.

2. The commercial game system of claim 1, wherein the media player device comprises a computer, the communications network comprises the Internet, and the advertisements are viewable on a website stored on the server and viewable on the display screen.

3. The commercial game system of claim 1, wherein the points are redeemable immediately or in the future.

4. A method that allows a user to answer advertisement related questions whereby correctly answered questions are awarded predetermined point values based on a predetermined set of value criteria that are redeemable for predetermined entertainment products, said method comprising the steps of:

(a) playing an advertisement on a display screen viewed by a user, wherein the advertisement comprises information related to a retail item;

(b) presenting the user a series of questions on the display screen related to the retail item;

(c) electronically awarding the user points saved into a user account stored on a server based upon the number of questions answered correctly by the user, the number of advertisements viewed, the length of time advertisements are viewed, the number of attempts at answering each question before providing the correct answer, for purchasing a specific good or service featured in one of the advertisements watched, or for purchasing a good from a featured brand shown in one of the advertisements watched, wherein the advertiser may set different values for points earned depending on whether the points are earned by watching advertisements, answering questions correctly, re-answering questions that are initially answered incorrectly, purchasing products advertised and sold on a particular website, or earned by a user whose point value was determined by evaluating the user's prior earned points and awarding a predetermined point value based the reward points alread earned by the user wherein the server is communicatively connected to the display screen;

(d) providing the user with a plurality of reward items for which the point earned by the user may be redeemed or gifted to a third party; and (e) selecting the reward item to be redeemed or gifted.

5. The method of claim 4, wherein the plurality of reward items comprises at least one item selected from the group consisting of: pay-per-view movie credits, cable television service credit, satellite television service credit, broadband service credit, premium television channel service credit, satellite radio service credit, on-demand television service credit, music downloads, movie downloads, video game plays, video game downloads, gas credits, airline miles, a downloadable publication, a downloadable video, a downloadable music file, a downloadable audio file, a downloadable audiobook, a streaming video file, a streaming audio file, a downloadable image file, a downloadable computer screen saver, a downloadable video file, a movie rental voucher, and other suitable retail goods and services.

6. The method of claim 4, wherein the retail item comprises a good or a service.

7. The method of claim 4, wherein the method further comprises the step of:

(e) permitting the user to gift either the points earned or the reward item selected by the user to a gift recipient, the points being distributable via a physical or electronic gift card.

8. A method that allows a user to answer advertisement related questions whereby correctly answered questions are awarded predetermined point values based on a predetermined set of value criteria that are redeemable for predetermined entertainment products, said method comprising the steps of:

(a) playing an advertisement for viewing by a user on a media player device that further comprises a display screen, wherein the media player device is communicatively connected to a server via a communications network;

(b) after the advertisement has been played for viewing by the user, displaying at least a first question on the display screen, wherein the first question is related to the advertisement;

(c) using the media player device, entering an answer to the first question presented on the display screen;

(d) transmitting the answer entered by the user from the media player device to the server over the communications network;

(e) using software installed on the server, comparing the user's answer to a stored correct answer programmed into the software;

(f) awarding one or more points to the user for a user-entered correct answer, the number of advertisements viewed, the length of time advertisements are viewed, the number of attempts at answering each question before providing the correct answer, for purchasing a specific good or service featured in one of the advertisements watched, or for purchasing a good from a featured brand shown in one of the advertisements watched, wherein the advertiser may set different values for points earned depending on whether the points are earned by watching advertisements, answering questions correctly, re-answering questions that are initially answered incorrectly, purchasing products advertised and sold on a particular website, or earned by a user whose point value was determined by evaluating the user's prior earned points and awarding a predetermined point value based the reward points already earned by the user;

(g) electronically recording the number of points awarded to the user on a storage device of the server in a user account associated with the user;

(h) transmitting the number of points awarded for the correct answer to the media player device and displaying the number of points awarded on the display screen; and (i) providing a virtual mall accessible through the media player device via the communications network, wherein the virtual mall displays items or services for sale for which the points awarded to the user are redeemable.

9. The method of claim 8, further comprising the step of:

(j) varying the number of points awarded for each correct answer based upon the level of difficulty of the question being answered, the number of advertisements viewed, the length of time advertisements are viewed, the number of attempts at answering each question before providing the correct answer, for purchasing a specific good or service featured in one of the advertisements watched, or for purchasing a good from a featured brand shown in one of the advertisements watched, wherein the advertiser may set different values for points earned depending on whether the points are earned by watching advertisements, answering questions correctly, re-answering questions that are initially answered incorrectly, purchasing products advertised and sold on a particular website, or earned by a user whose point value was determined by evaluating the user's prior earned points and awarding a predetermined point value based the reward points already earned by the user.

10. The method of claim 8, further comprising the step of:
(k) providing a gifting control communicatively connected to the server, whereby the user redeems points the user has earned by viewing advertisements and answering questions to be delivered as a gift for another person.

11. The method of claim 8, further comprising the step of:
(l) awarding points to the user for incorrect answers to questions in an amount that is less than the number of points awarded for correct answers to the same questions.

12. The method of claim 8, further comprising the step of:
(m) providing the user with a second chance to answer each question when the software installed on the server determines that the answer to a particular question entered by the user is incorrect, wherein the number of points awarded for a correct answer to the question during the user's second chance is less than the number of points that are awarded for correct answer to the question during the user's first chance.

13. The method of claim 8, further comprising the step of:
(n) providing the user with at least a second question to be answered that is different from the first question when the software installed on the server determines that the user has entered an incorrect answer to the first question.

14. The method of claim 13, further comprising the step of:
(o) awarding the user a number of points for a correct answer to the at least second question that is less than the number of points that are awarded for a correct answer to the first question.

15. The method of claim 13, further comprising the step of:
(p) awarding the user a number of points for a correct answer to the at least second question that is more than the number of points that are awarded for a correct answer to the first question.

16. The method of claim 8, further comprising the steps of:
(q) registering each user by requiring each user to submit personal information that is input into the media player device to the server via the communications network;
(r) compiling data that is stored in a database in the server transmitted from the media player device via the communications network, wherein the data comprises the personal information submitted by the user and website usage data related to the user's shopping and browsing habits; and
(s) providing the data to one or more buyers, wherein the buyers are advertisers, retailers, distributors, and manufacturers.

17. The method of claim 8, wherein the number of points awarded to the user for playing and interacting with advertisements provided by a first advertiser is different than the number of points awarded to the user for playing and interacting with advertisements provided by a second advertiser.

18. The method of claim 8, wherein the points earned by the user through playing and interacting with advertisements provided by a first advertiser have a redemption value that is different from the redemption value of points earned by the user through playing and interacting with advertisements provided by a second advertiser.

19. The method of claim 8, further comprising the step of:
(q) awarding the user a number of points dependent upon the number of seconds of advertising viewed.

20. The method of claim 8, wherein the user can select the number of advertisements viewed.

21. The method of claim 8, wherein the media player device comprises a device selected from the group consisting of: a computer, a notebook computer, a television, a cellular telephone, a smartphone, a personal digital assistant (PDA), a global positioning system (GPS) device, a handheld gaming device, any other suitable handheld electronic device comprising a display screen, and any other suitable media player device comprising a display screen.

22. The method of claim 8, wherein the display screen comprises a communicatively connected touch screen that comprises touch screen controls.

23. The method of claim 8, wherein the media player device further comprises a communicatively connected pointing device.

24. The method of claim 8, wherein the media player device further comprises a communicatively connected control device.

25. The method of claim 8, wherein the items and services for which points can be redeemed comprise at least one item or service selected from the group consisting of: pay-per-view movie credits, cable television service credit, satellite television service credit, broadband service credit, premium television channel service credit, satellite radio service credit, on-demand television service credit, music downloads, movie downloads, video game plays, video game downloads, gas credits, airline miles, a downloadable publication, a downloadable video, a downloadable music file, a downloadable audio file, a downloadable audiobook, a streaming video file, a streaming audio file, a downloadable image file, a downloadable computer screen saver, a downloadable video file, a movie rental voucher, and other suitable retail goods and services.

* * * * *